United States Patent [19]
Yoshida

[11] Patent Number: 5,392,100
[45] Date of Patent: Feb. 21, 1995

[54] IMAGING DEVICE HAVING DUAL SCANNERS

[75] Inventor: Naoki Yoshida, Tokorozawa, Japan

[73] Assignee: Asahi Kogaku Kogyo Kabushiki Kaisha, Tokyo, Japan

[21] Appl. No.: 977,009

[22] Filed: Nov. 16, 1992

[30] Foreign Application Priority Data

| Nov. 15, 1991 | [JP] | Japan | 3-326922 |
| Nov. 15, 1991 | [JP] | Japan | 3-326923 |
| Nov. 15, 1991 | [JP] | Japan | 3-326924 |
| Nov. 15, 1991 | [JP] | Japan | 3-326925 |
| Nov. 20, 1991 | [JP] | Japan | 3-331240 |
| Nov. 20, 1991 | [JP] | Japan | 3-331241 |
| Dec. 6, 1991 | [JP] | Japan | 3-348954 |
| Dec. 11, 1991 | [JP] | Japan | 3-351004 |
| Dec. 11, 1991 | [JP] | Japan | 3-351005 |

[51] Int. Cl.6 .................. G03G 15/28; H04N 1/04; H04N 1/10
[52] U.S. Cl. .................. 355/235; 355/75; 358/494; 358/497
[58] Field of Search .......... 355/235, 236, 71, 75; 358/483, 494, 497

[56] References Cited

U.S. PATENT DOCUMENTS

| Re. 27,700 | 7/1973 | Suzuki et al. | 355/235 X |
| 4,084,898 | 4/1978 | Kurita | 355/235 |
| 4,097,145 | 6/1978 | Luperti et al. | 355/75 |
| 4,110,041 | 8/1978 | Luperti et al. | 355/75 |
| 4,422,100 | 12/1983 | DuVall et al. | 358/497 |
| 4,432,639 | 2/1984 | Saitou et al. | 355/75 |
| 4,616,765 | 10/1986 | Katoh | 355/75 X |
| 4,736,251 | 4/1988 | Sasdoka | 358/494 X |
| 4,771,315 | 9/1988 | Satomi | 355/235 |
| 4,862,218 | 8/1989 | Tsunoda et al. | 355/235 |
| 4,893,196 | 1/1990 | Koshiyouji et al. | 358/497 X |
| 4,908,717 | 3/1990 | Natori | 358/497 X |
| 4,937,613 | 6/1990 | Sawaki et al. | 365/75 X |
| 4,989,099 | 1/1991 | Koshiyouji et al. | 358/497 X |
| 4,991,030 | 2/1991 | Sato et al. | 358/497 X |
| 5,221,974 | 6/1993 | Kusumoto et al. | 355/235 X |

Primary Examiner—Fred L. Braun
Attorney, Agent, or Firm—Sandler, Greenblum & Bernstein

[57] ABSTRACT

An imaging device has an optical scanning unit movably housed in a housing below a transparent document support for optically scanning a document placed on the transparent document support. The transparent document support can selectively be covered with a cover hinged to the housing. A semitransparently opalescent diffusion plate is mounted on the cover in facing relationship to the transparent document support. The cover houses a lamp unit for emitting light through the diffusion plate toward the transparent document support to irradiate the document placed thereon. A reflective document placed on the document support is irradiated by light emitted from the optical scanning unit. A reflected optical document image is applied through the optical scanning unit to an image sensor. A transmissive document placed on the document support is irradiated by light emitted from the lamp unit in the cover, and a transmitted optical document image is applied through the optical scanning unit to the image sensor. The lamp unit has lock mechanism for locking the lamp unit against movement in the cover when desired.

4 Claims, 35 Drawing Sheets

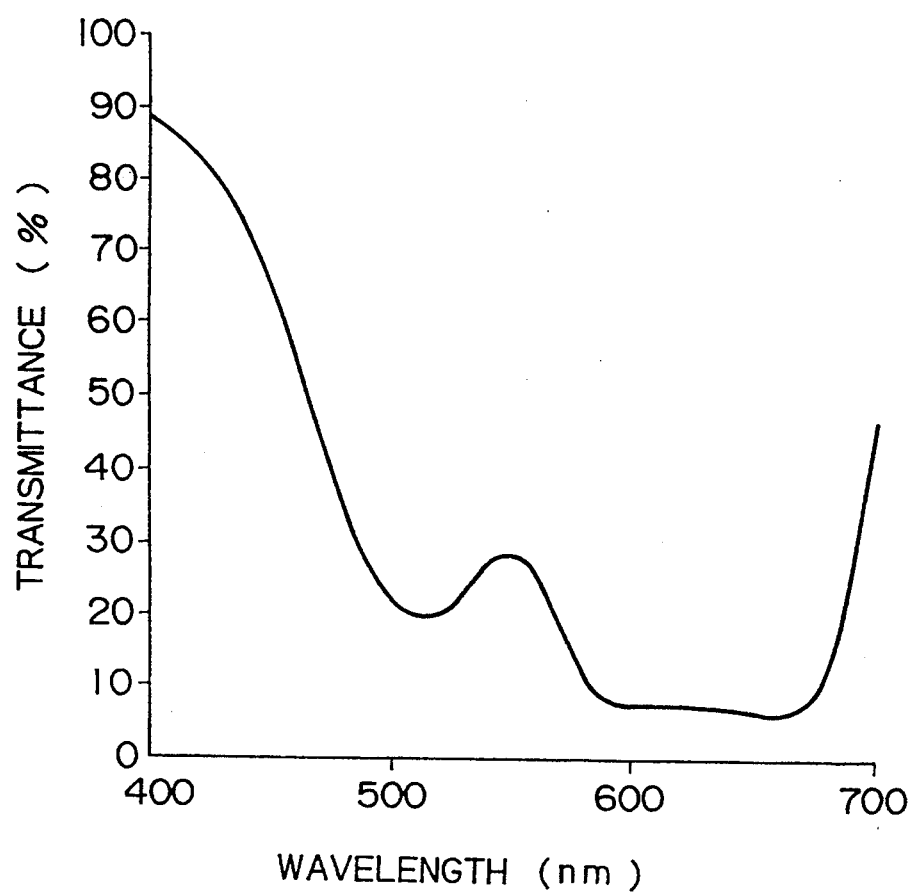
F I G. 19

IMAGING DEVICE HAVING DUAL SCANNERS

BACKGROUND OF THE INVENTION

The present invention relates to an imaging device such as an image reading apparatus, a copying machine and a facsimile machine, wherein image information of an original subject is read as electric signals.

There are known image reading apparatus, sometimes referred to as image scanners, for reading character and image information on a document as electric signals. Some image reading apparatus have a document support in the form of a transparent plate of glass, or the like, for supporting a document thereon. The reflected optical image of a document placed on the document support is focused on a photosensitive surface of an image sensor by a lens, and the image sensor converts the image information into electric signals. The document support can be covered with a swingable cover positioned thereabove. The cover is associated with a document holder positioned therebeneath for holding the document down against the document support.

The image sensor includes a linear sensor composed of an array of imaging elements known as pixels. The linear sensor is fixedly positioned below the document support. The image reading apparatus also has an optical system for scanning the document on the document support in a direction normal to the array of pixels, and applying the optical document image to the linear sensor. The linear sensor scans the document in one direction (main scanning direction), while the document image focused on the linear sensor is moved in a direction (auxiliary scanning direction) normal to the array of pixels of the linear sensor.

The optical system includes a scanning unit movable perpendicularly to the array of pixels of the linear sensor. When the scanning unit moves, the document image focused on the linear sensor is moved in the auxiliary scanning direction. Therefore, the linear sensor and the scanning unit jointly scan the document two-dimensionally.

A mirror unit interlinked with the scanning unit is disposed in an optical path between the scanning unit and the lens for keeping constant the distance (optical path length) between the scanned position on the document and the lens irrespective of movement of the scanning unit.

The mirror unit comprises two mirrors lying perpendicularly to each other and having reflecting surfaces facing each other. The two mirrors are positioned to direct the document image, which has been reflected horizontally by a mirror fixed to the scanning unit, backwards to the lens. The mirror unit is movable in ganged relationship to the scanning unit such that the mirror unit moves in the same direction as the scanning unit for a distance that is half the distance traversed by the scanning unit. When the scanning unit moves to scan the document, any change in the length of the optical path followed by the document image is canceled out by the movement of the mirror unit. Therefore, the optical path followed by the document image, which optical path extends from the scanning position on the document to the lens, is rendered constant at all times irrespective of movement of the scanning unit. As a result, the focus of the document image on the linear sensor remains unchanged, and the lens and the linear sensor may be fixedly positioned with respect to each other.

The image reading apparatus of the type described above is used for reading reflective documents, i.e., documents which reflect light, and not suitable for reading transmissive documents, i.e., documents which pass light therethrough. To be able to read transmissive documents, the above image reading apparatus for reading reflective documents needs certain modifications. For example, an image reading apparatus for reading transmissive documents requires a light source positioned above the document support and movable in synchronism with the scanning unit for applying light to a transmissive document. Alternatively, an optical system disposed in the cover for guiding light emitted from a light source below the document support and transmitted through a transmissive document to the linear sensor disposed beneath the document support. To convert the image reading apparatus for reading reflective documents into an image reading apparatus for reading transmissive documents, the cover is replaced with a cover housing an optical system, and the optical system below the document support is modified. Furthermore, the document holder is removed, and the document is sandwiched between two sheets of glass, for example, when placed on the document support.

However, the above modifications are quite complex and time-consuming. Once the image reading apparatus has been modified, it can no longer be used to read reflective documents, and hence lose compatibility between reflective and transmissive documents. Another problem with the modified image reading apparatus is that it is not easy to place the document on the document support, because the document has to be sandwiched between the two sheets of glass.

Generally, the scanning unit is moved over a stroke by an endless belt or wire connected to the scanning unit, and trained around drive and driven pulleys. The endless belt or wire has straight section corresponding to the stroke. When a motor connected to the drive pulley is energized, the endless belt or wire is driven to move the scanning unit.

Since the accuracy, with which a document is read, is governed by the accuracy, of scanning movement of the scanning unit, it is necessary to control the scanning movement of the scanning unit with high accuracy. The ganged structure of the mirror unit and the scanning unit also needs high accuracy. If the drive pulley for moving the scanning unit through the endless belt or wire has an eccentricity error, then the scanning speed of the scanning unit is periodically varied even if the rotation of the drive pulley is precisely controlled.

The mirror unit is ganged with the scanning unit by a pulley rotatably mounted on the mirror unit for rotation about an axis normal to the direction of movement of the mirror unit. A wire or belt is trained around the pulley, with the wire or belt having one end connected to the scanning unit and the other end to an apparatus frame. The mirror unit is normally urged away from the wire or belt by a spring. The spring pulls the mirror unit, placing the wire or belt under tension. With the above ganged arrangement, when the scanning unit moves, the mirror unit moves over a distance which is half the distance traversed by the scanning unit.

As the mirror unit moves upon movement of the scanning unit, the elastic deformation of the spring varies, and so does the biasing force of the spring. The varying bias of the spring results in a change in the resistance to the forces which drive the scanning unit, affecting the scanning movement of the scanning unit in a manner to lower the accuracy with which the document is read. For this reason, it is desirable that the spring has a small spring constant and produces a bias that changes little when the mirror unit moves. The spring with a small spring, constant, is however large in size, and is not preferable from the standpoint of efforts to reduce the size of the entire image reading apparatus.

When the image reading apparatus itself is moved for shipment or the like, the movable components, including the scanning unit and the mirror unit, are usually fastened in position against movement to avoid damage or malfunctioning which would otherwise tend to occur if the movable components were loose and moved by vibrations or shocks. The movable components are generally fastened by screws that are inserted, from outside of an apparatus housing, through holes defined in the apparatus housing into threaded holes defined in the movable components.

Since the movable components are spaced from the inner surface of the housing, it is difficult to thread the screws into the threaded holes of the movable components.

Usually, the lengths of the threaded holes in the movable components are limited. Consequently, the screws used to fasten the movable components have different lengths depending on the distance between the outer surface of the apparatus housing and the movable components. Selective use of the screws of different length is cumbersome, and the screws should be kept in storage in case they are needed when the image reading apparatus is to be moved again.

In the image reading apparatus, the illuminance of the light source or lamp for irradiating the document suffers variations or fluctuations in the main scanning direction, resulting in variations in a bright signal from the image sensor. In addition, even when no document image is applied to the image sensor, the image sensor produces a certain output signal due to a dark current thereof and stray light in the optical system. Such an output signals from the image sensor, aggravated by different sensitivities of the sensor pixels, also gives rise to signal variations or fluctuations in the main scanning direction, resulting in variations in a dark signal from the image sensor. Such signals variations or fluctuations prevent the image sensor from producing correct image signals. Therefore, it has been customary to carry out a corrective procedure prior to a scanning process.

According to the corrective procedure, the image sensor detects image information from a white reference plate to produce an output signals as a bright signal. When the lamp is de-energized, the image sensor produces an output signal as a dark signals. The difference between the levels of the bright and dark signals is normalized.

However, when the lamp is de-energized for the image sensor to produce a dark signals, it takes a certain period of time until the lamp reaches a stable de-energized condition. Inasmuch as such a corrective procedure prior to a scanning process is time-consuming, therefore, the operation of the image reading apparatus to read the document cannot be speeded up.

Color image reading apparatus, for reading a colored document by way of color separation, mostly employs a halogen lamp for irradiating the document as the halogen lamp has linearly varying spectral output characteristics over the visible spectrum range. However, the halogen lamp emits an intensive unwanted thermal radiation, i.e., far-infrared radiation, which heats the document and the image sensor, thus causing a change in the photosensitive characteristics of the image sensor.

Some recent color image reading apparatus have a color sensor comprising an assembly of parallel linear sensors and color filters for passing light of different wavelengths. The color filters are disposed over the photosensitive surfaces of the linear sensors to provide predetermined spectral sensitivities. When a colored document is scanned in one cycle, the light from the colored document is separated into different wavelengths, e.g., those of three colors of red, green, and blue.

To read a colored document with such a color sensor for producing color image information of high accuracy, i.e., good color balance, it is necessary that the color sensor reads the document with uniform sensitivity over the respective wavelength ranges. Specifically, the document should be illuminated with light containing uniform wavelength components and the linear sensor should have uniform sensitivity over the respective wavelength ranges.

Since the spectral sensitivities of the color sensor depend on the spectral characteristics of the color filters used, difficulty is experienced in uniformizing the sensitivities in the respective wavelength ranges. The halogen lamp for irradiating the document actually has different spectral output characteristics in the respective wavelength ranges. Consequently, output signals from the color sensor must be corrected in some way to produce uniform image signals in the respective wavelength ranges. One corrective process would be to vary the amplification degrees for the output signals from the color sensor, but color image information would not be produced with high accuracy according to such a corrective process.

Some electrophotographic copying machines for producing hard copies also have a document support in the form of a sheet of glass for supporting a document to be copied and a swingable pivoted cover for selectively covering the document support. It is necessary that the cover be openable and closable smoothly with small manual forces, and also be closable without disturbing the document which has been placed on the document support. The cover is normally urged into the open position by a spring or the like.

The moment applied to the cover due to its own weight, in a direction to close the cover, varies depending on the angle at which the cover lies with respect to the document support. Accordingly, the spring or the like, which biases the cover to the open position, should have its bias variable as the applied moment varies, so that the spring bias and the moment are held in equilibrium to keep the cover at rest in any desired angular position. Even if the spring bias is selected to counterbalance the moment, however, since a kinetic energy is applied to the cover while it is being opened or closed, the cover may not be held at rest in any desired angular position, and may be closed abruptly especially when the user attempts to close the cover. If the spring bias is increased to prevent the cover from being closed abruptly, then the cover tends to move to the open position. It has been highly difficult to adjust the spring bias to a proper setting.

SUMMARY OF THE INVENTION

It is therefore an object of the present invention to provide an imaging device which is capable of reading image information of both reflective and transmissive documents.

A second object of the present invention is to provide an imaging device which has a scanning unit and a mirror unit that can be moved precisely in ganged relationship for reading image information highly accurately.

A third object of the present invention is to provide an imaging device which has a scanning unit and a mirror unit, with the mirror unit being normally urged by a spring whose biasing forces vary to a small extent upon movement of the mirror unit, and which is relatively small in size.

A fourth object of the present invention is to provide an imaging device including movable components that can temporarily be fastened in place upon shipment or the like.

A fifth object of the present invention is to provide an imaging device which can produce a dark current without de-energization of a lamp unit, for thereby speeding up an image reading process.

A six object of the present invention is to provide an imaging device which prevents a document and an image sensor from being thermally adversely affected by lamp units comprising halogen lamps.

A seventh object of the present invention is to provide a color imaging device which is capable of uniformizing spectral sensitivities in different wavelength ranges for producing highly accurate image information.

An eighth object of the present invention is to provide a cover structure which can smoothly be opened and closed, and is prevented from being abruptly closed.

According to the present invention, there is provided an imaging device including a housing, a transparent document support mounted on the housing for supporting a document thereon, and an optical scanning device, movably housed in the housing below the transparent document support, for optically scanning a document placed on the transparent document support. The imaginary device further includes a cover movably mounted on the housing for covering the transparent document support, a diffusion plate mounted on the cover in facing relationship to the transparent document support, and a light source housed in the cover for emitting light through the diffusion plate toward the transparent document support.

According to another aspect of the present invention, there Is provided an imaging device including a housing, a transparent document support mounted on the housing for supporting a document thereon, and an optical scanning means, movably housed in the housing below the transparent document support, for optically scanning a document placed on the transparent document support. The imaging device further includes a ball screw assembly including a ball nut fixed to the optical scanning device and a ball screw rotatably mounted in the housing and threaded through the ball nut, an actuating means disposed in the housing, for rotating the ball screw about its own axis to move the optical scanning means.

According to still another aspect of the present invention, there is provided an imaging device including a housing, a transparent document support mounted on the housing for supporting a document thereon, and an optical scanning device, movably housed in the housing below the transparent document support, for optically scanning a document placed on the transparent document support. The imaging device further includes a ball screw assembly including a ball nut fixed to the optical scanning device and a ball screw rotatably mounted in the housing and threaded through the ball nut, and an actuating device disposed in the housing, for rotating the ball screw about its own axis to move the optical scanning device.

According to yet another aspect of the present invention, there is provided an imaging device including a housing, a transparent document support mounted on the housing for supporting a document thereon, and a scanning unit, movably housed in the housing below the transparent document support, for optically scanning a document placed on the transparent document support. The imaging device further includes a mirror unit operatively coupled to the scanning unit for reflecting an optical image of the document to the scanning unit, and device for moving the mirror unit over a distance which is substantially half the distance traversed by the scanning unit.

According to yet still another aspect of the present invention, there is provided an imaging device including a housing, a transparent document support mounted on the housing for supporting a document thereon, and a optical scanning device, movably housed in the housing below the transparent document support, for optically scanning a document placed on the transparent document support, with the optical scanning device having a slider. The image device further includes a guide member mounted in the housing for guiding the slider to slide therealong, and locking device mounted on the housing, for pressing the slider against the guide member to lock the optical scanning member against movement along the guide member.

According to a further aspect of the present invention, there is provided an imaging device including a housing, a transparent document support mounted on the housing for supporting a document thereon, and an optical scanning device, movably housed in the housing below the transparent document support, for optically scanning a document placed on the transparent document support. The image device further includes a cover movably mounted on the housing for covering the transparent document support, a diffusion plate mounted on the cover in facing relationship to the transparent document and, a lamp unit housed in the cover for emitting light through the diffusion plate toward the transparent document support to irradiate the document placed thereon. The lamp unit being movable in synchronism with the optical scanning device, with the lamp unit having a slider. The image device also includes a guide member mounted in the cover for guiding the slider to slide therealong, and locking device mounted in the cover, for engaging the lamp unit to lock the slider against movement along the guide member.

According to a still further aspect of the present invention, there is provided an imaging device including a scanning unit movable over a predetermined interval for optically scanning a document. The scanning unit has a linear sensor for photoelectrically converting an optical image of the document into electric signals, and a shield plate for interrupts an optical path between the document and the linear sensor, when the scanning unit is positioned out of the interval.

According to a yet still further aspect of the present invention, there is provided an imaging device including a scanning unit for optically scanning a document, the scanning unit having a linear sensor for photoelectrically converting an optical image of the document into electric signals, a shield plate movable into an optical path between the document and the linear sensor for interrupting the optical path, and device for moving the shield plate into the optical path.

According to still another aspect of the present invention, there is provided an imaging device including a housing, a transparent document support mounted on the housing for supporting a document thereon, and an optical scanning device, movably housed in the housing below the transparent document support, for optically scanning a document placed on the transparent document support. The optically scanning device including a lamp device for emitting light to irradiate the document placed on the transparent document support, and a heat absorbing filter disposed on one side of the lamp device closer to the document support, whereby the light emitted from the lamp can be applied through the heat absorbing filter to the document on the transparent document support.

According to yet another aspect of the present invention, there is provided a color imaging device including a transparent document support for supporting a document thereon, and a sensor unit movably disposed on one side of the transparent document support for detecting an optical image of the document on the transparent document support. The sensor unit including a plurality of Juxtaposed linear sensors having different spectral sensitivities, a lens for focusing the optical image on the linear sensors, and a color correcting filter disposed adjacent to the lens for correcting the spectral sensitivities of the linear sensors. The color imaging device further includes an optical scanning device for optically scanning a document placed on the transparent document support to apply the optical image of the document to the lens.

According to yet still another aspect of the present invention, there is provided an imaging device including a housing, a transparent document support mounted on the housing for supporting a document thereon, and an optical scanning device, movably housed in the housing below the transparent document support, for optically scanning a document placed on the transparent document support. The imaging device further includes an cover angularly, movably mounted on the housing for covering the transparent document support, a first urging device for urging the cover to angularly move in a full angular range from a closed position to an open position, a and second urging device for urging the cover to angularly move in a limited angular range from the closed position.

According to a still further aspect of the present invention, there is provided an imaging device including a housing, a transparent document support mounted on the housing for supporting a document thereon, optical scanning device, movably housed in the housing below the transparent document support, for optically scanning a document placed on the transparent document support, a cover angularly movably mounted on the housing for covering the transparent document support, and a friction device coupled to the housing and the cover for producing a frictional force to resist angular movement of the cover when the cover is angularly moved.

DESCRIPTION OF THE ACCOMPANYING DRAWINGS

FIG. 19 is a graph showing spectral transmission characteristics of another color correcting filter;

DESCRIPTION OF THE EMBODIMENT

Figure 1:
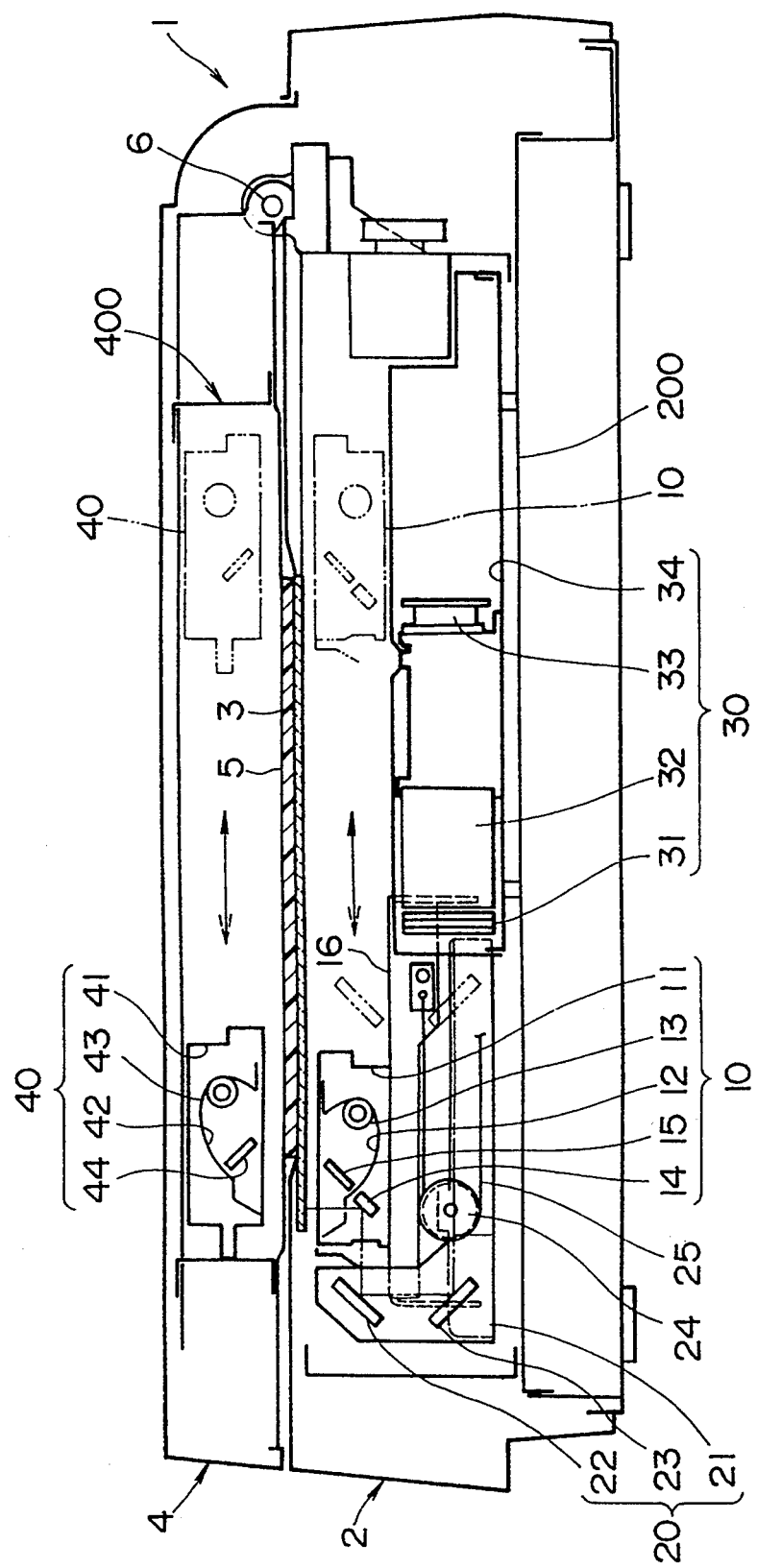
FIG. 1 is a schematic vertical cross-sectional view of an image reading apparatus according to the present invention.

As shown in FIG. 1, an image reading apparatus 1 embodying the present invention, which is a color image reading apparatus in the illustrated embodiment, has a housing 2 including a document support 3 in the form of a transparent plate of glass in an upper portion of the housing 2. The image reading apparatus 1 also has a swingable cover 4 pivotally hinged to the housing 2 for covering an upper surface of the document support 3.

The housing 2 accommodates a lamp unit 10 (scanning unit) for irradiating a reflective document placed on the document support 3, a mirror unit 20, and a sensor unit 30 including a filter group 31, a lens 32, and a color image sensor 33.

The lamp unit 10 comprises a halogen lamp 13 disposed in a reflecting member 12 which opens obliquely upward. The reflecting member 12 is supported in a lamp unit frame 11. A first mirror 14 is disposed in the lamp unit frame 11 on one side of the reflecting member 12 near its upper open end. The lamp unit 10 includes a glass cover 15 disposed in the open end of the reflecting member 12. The glass cover 15 comprises a heat absorbing filter. Light emitted from the halogen lamp 13 passes through the glass cover 15, and is applied to the lower surface of a document which is placed on the document support 3. The first mirror 14 is positioned below the document which is irradiated by the halogen lamp 13. The first mirror 14 and is inclined at an angle of 45° with respect to the document support 3 with its reflecting surface facing upwardly to reflect an optical document image horizontally to the left in FIG. 1. The lamp unit 10 is movable back and forth, i.e., to the right and left in FIG. 1, over a predetermined stroke by an actuator mechanism (described later on).

The mirror unit 20 has a second mirror 22 and a third mirror 23. The second mirror 22 is horizontally aligned with the first mirror 14 and inclined at an angle of 45° with respect to the document support 3 with its reflecting surface facing downwardly. The third mirror 23 is vertically aligned with the second mirror 22 and inclined at an angle of 45° with respect to the document support 3 with its reflecting surface facing upwardly. Therefore, the reflecting surfaces of the second and third mirrors 22 face each other such that their extensions intersect with each other at an angle of 90°. Therefore, the optical document image reflected by the first mirror 14 is reflected vertically downwardly by the second mirror 22, and then reflected horizontally to the right by the third mirror 23. Upon movement of the lamp unit 10, the mirror unit 20 is moved by an interlinking mechanism (described later on) over a distance which is half the distance that is traversed by the lamp unit 10.

The filter group 31, the lens 32, and the color image sensor 33 of the sensor unit 30 are arranged successively in series on a unit base 34. The filter group 31 is positioned close to the mirror unit 20 for receiving the optical document image reflected by the third mirror 23. The sensor unit 30 is fixedly mounted on a chassis 200, in the housing 2, substantially centrally below the horizontal range in which the lamp unit 10 moves for scanning the document on the document support 3.

The lens 32 has a fixed focal point for focusing the optical document image, which has passed through the filter group 31, on the photosensitive surface of the color image sensor 33.

The color image sensor 33 comprises three parallel CCD (charge-coupled device) linear sensors each composed of a linear array of imaging elements or pixels. The CCD linear sensors serve to detect light in red, green, and blue, respectively. The CCD linear sensors have a length large enough to cover the width of the optical document image as it is focused thereon. The arrays of pixels are oriented in alignment in the transverse direction of the optical document image.

The cover 4 is pivotally coupled to one end (right-hand end in FIG. 1) by a pivot shaft 6 so as to be swingably openable and closable with respect to the document support 3. The cover 4 has a semitransparently opalescent diffusion plate 5 of acrylic resin on the lower surface thereof, and houses a lamp unit 40 for irradiating a transmissive document.

The diffusion plate 5 is attached to the cover 4 while being urged by springs at respective four corners thereof, and can be moved a certain stroke with respect to the cover 4 against the bias of the springs. When the cover 4 is closed, i.e., placed over the document support 3, the lower surface of the diffusion plate 5 is held in close contact with the upper surface of the document support 3 under the bias of the springs.

The lamp units 10, 40 are substantially symmetrical in shape and structure. The lamp unit 40 includes a halogen lamp 43 disposed in an obliquely downward opening reflecting member 42 supported in a lamp unit frame 41, and a glass cover 44 positioned in the open end of the reflecting member 42. The lamp unit 40 is movable back and forth, i.e., to the right and left in FIG. 1, over a predetermined stroke.

When a reflective document is to be read, it is placed on the document support 3 with its surface facing downwardly. The surface of the reflective document is irradiated by the halogen lamp 13 of the lamp unit 10 in the housing 2. At the same time, the lamp unit 10 is moved at a predetermined speed, and image information of the reflective document is detected by the color image sensor 88 of the sensor unit 80. More specifically, an optical document image of the portion of the reflective document, which is irradiated by the halogen lamp 13, is reflected toward the mirror unit 20 by the first mirror 14, and then reflected toward the sensor unit 80 by the second and third mirrors 22, 28. The optical document image applied to the sensor unit 80 is converted into an electric signals by the color image sensor 83. In this manner, the document is scanned transversely in a main scanning direction. Simultaneously, the lamp unit 10 is moved to move the optical document image longitudinally of the document for thereby scanning the document longitudinally in an auxiliary scanning direction. At this time, the lamp unit 40 is deenergized.

When a transmissive document is to be read, it is placed on the document support 8 with its surface facing downwardly, and is irradiated by the halogen lamp 48 of the lamp unit 40 in the cover 4. At the same time, the lamp units 40, 10 are moved at a predetermined speed in synchronism with each other, and image information of the transmissive document is detected by the color image sensor 88 of the sensor unit 30. More specifically, light emitted from the lamp unit 40 passes through the glass cover 44, irradiating the diffusion plate 5. The light which has passed the diffusion plate 5 then passes through the transmissive document on the document support 3. The light having passed through the transmissive document, representing an optical document image of the transmissive document, is reflected toward the mirror unit 20 by the first mirror 14, and then reflected toward the sensor unit 30 by the second and third mirrors 22, 23. The optical document image of the transmissive document is thus read by the color image sensor 33 in the same manner as the optical document image of the reflective document is read. At this time, the halogen lamp 13 of the lamp unit 10 is deenergized.

The diffusion plate 5 serves to hold the reflective document down against the document support 3. The diffusion plate 5 serves to hold the transmissive document down against the document support 3 and also to diffuse light from the halogen lamp 43 for irradiating the transmissive document.

The reflectance and transmittance of the diffusion plate 5 may be selected in view of the wavelength of the light emitted from the lamp unit 40 and the sensitivity characteristics of the sensor unit 30. An experiment indicates that reflective and transmissive documents could be read well using a diffusion plate having a reflectance of 60% and a transmittance of 40%.

With the diffusion plate 5 attached to the lower surface of the cover 4 and the lamp unit 40 housed in the cover 4 in ganged relationship to the lamp unit 10, the image reading apparatus 1 can read both reflective and transmissive documents without modifications which would otherwise be needed on the image reading apparatus 1.

Figure 2:
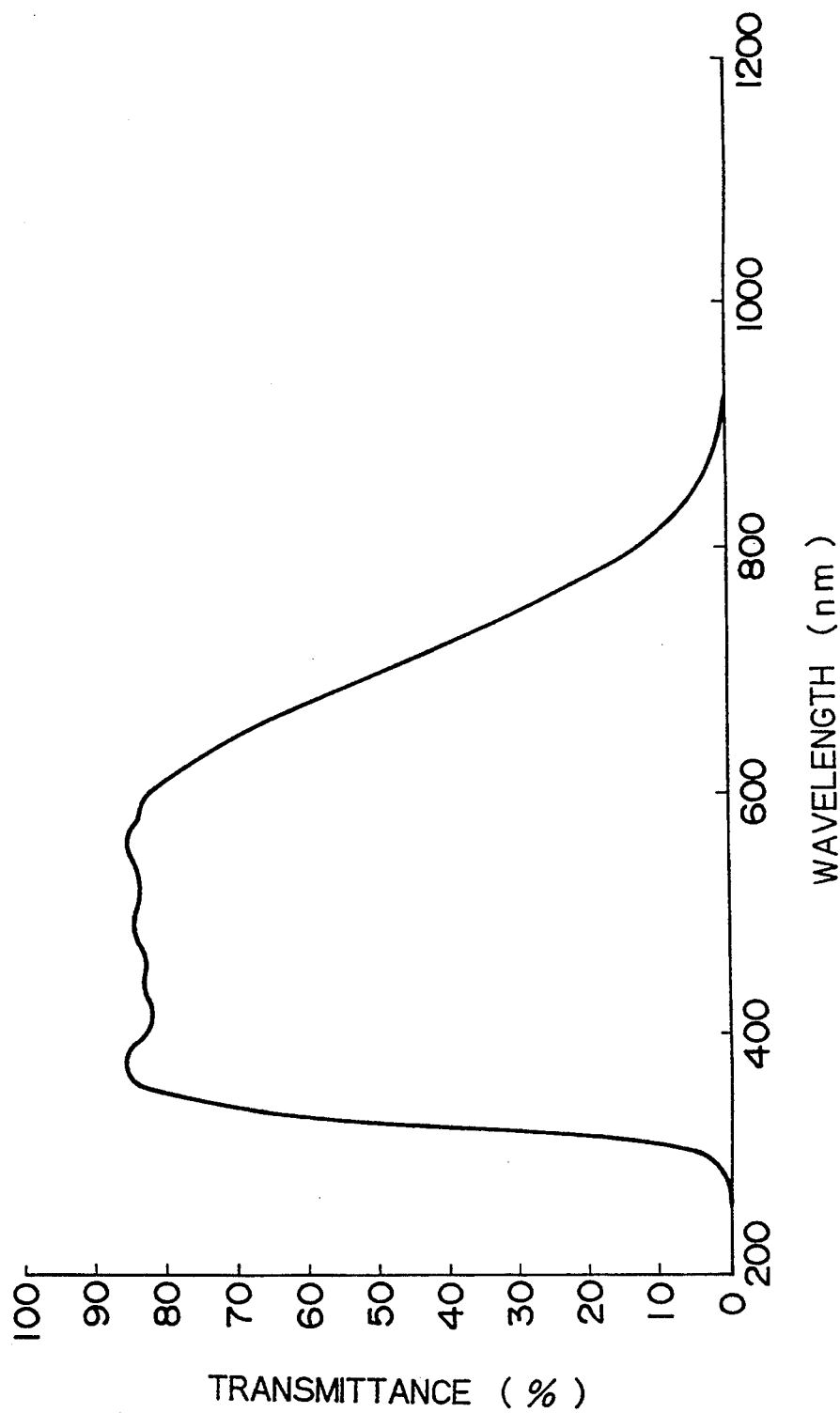
FIG. 2 is a graph showing spectral transmission characteristics of a glass cover.

The glass covers 15, 44 comprise heat absorbing filters, respectively, which absorb infrared radiation and particularly absorbs 100% of radiation above a wavelength of 860 nm, as indicated by spectral transmission characteristics as shown in FIG. 2.

Figure 3:
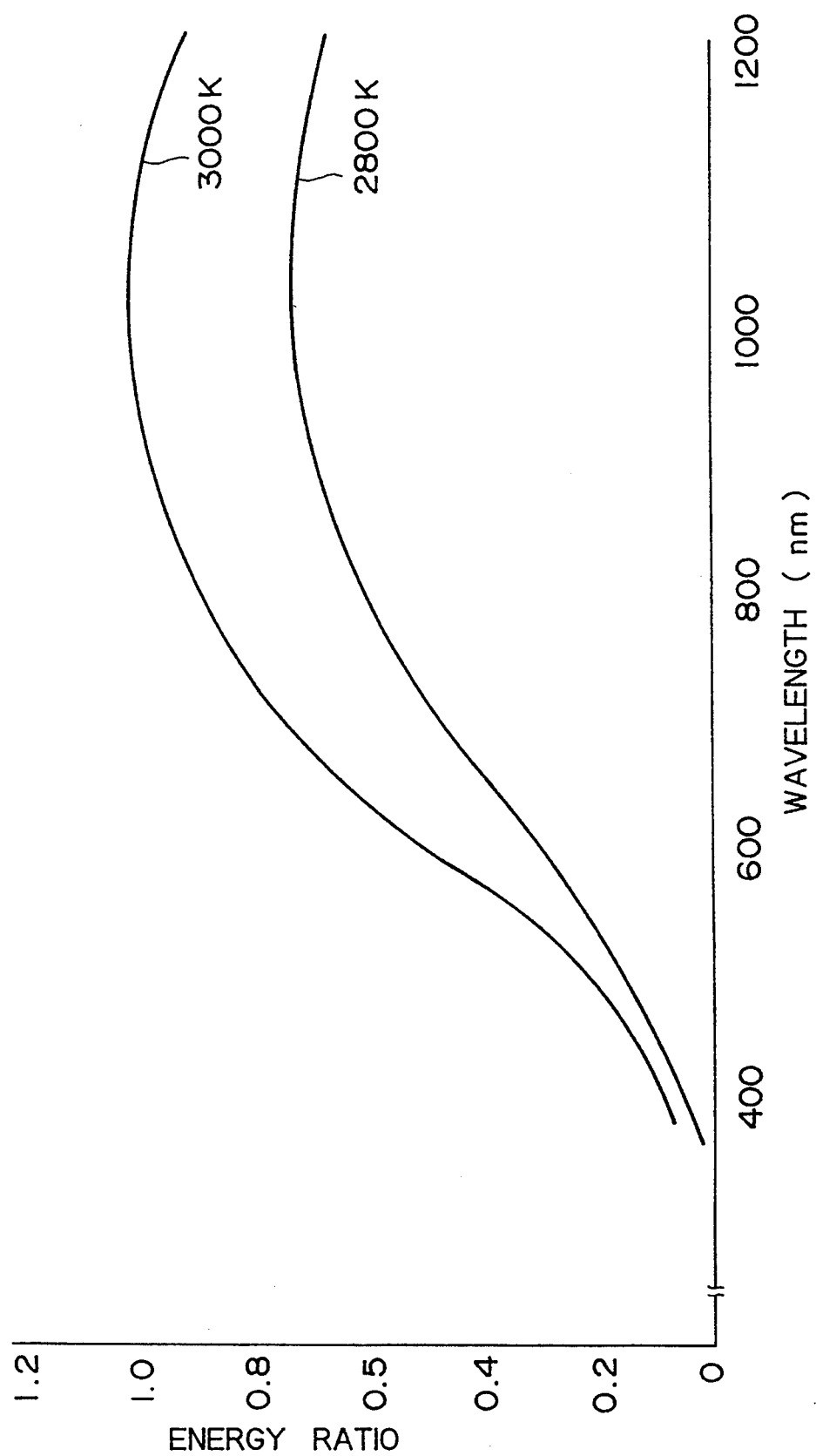
FIG. 3 is a graph showing spectral output characteristics of halogen lamps of lamp units.

The halogen lamps 13, 43 have spectral output characteristics as shown in FIG. 3. Since the spectral output characteristics linearly vary in a visible spectrum range, the halogen lamps 13, 43 are preferred as light sources for color image reading apparatus to fluorescent lamps. However, the halogen lamps 13, 43 produce an intensive infrared radiation level above 750 nm which would otherwise damage the document with heat and also heat the sensor unit 30, resulting in changes in the photosensitive characteristics of the sensor unit 30. The glass covers 15, 44 with the above spectral transmission characteristics are effective to absorb the intensive infrared radiation level produced by the halogen lamps 13, 43.

Irrespective of whether a reflective or transmissive document is read, it is irradiated with light including no infrared radiation. Therefore, the document is prevented from being heated, and no far-infrared radiation reaches the sensor unit 30. The color image sensor 33 is thus not heated by the light applied thereto.

Inasmuch as the glass covers 15, 44, which are positioned at the exit ends of the lamp units 10, 40, absorb the heat radiated by the halogen lamps 13, 43, the document and the sensor unit 30 are not heated, and hence the sensor unit 30 can stably read the image information without being adversely effected by heat.

The lamp unit 10 and the mirror unit 20 will be described in detail below.

Figure 4:
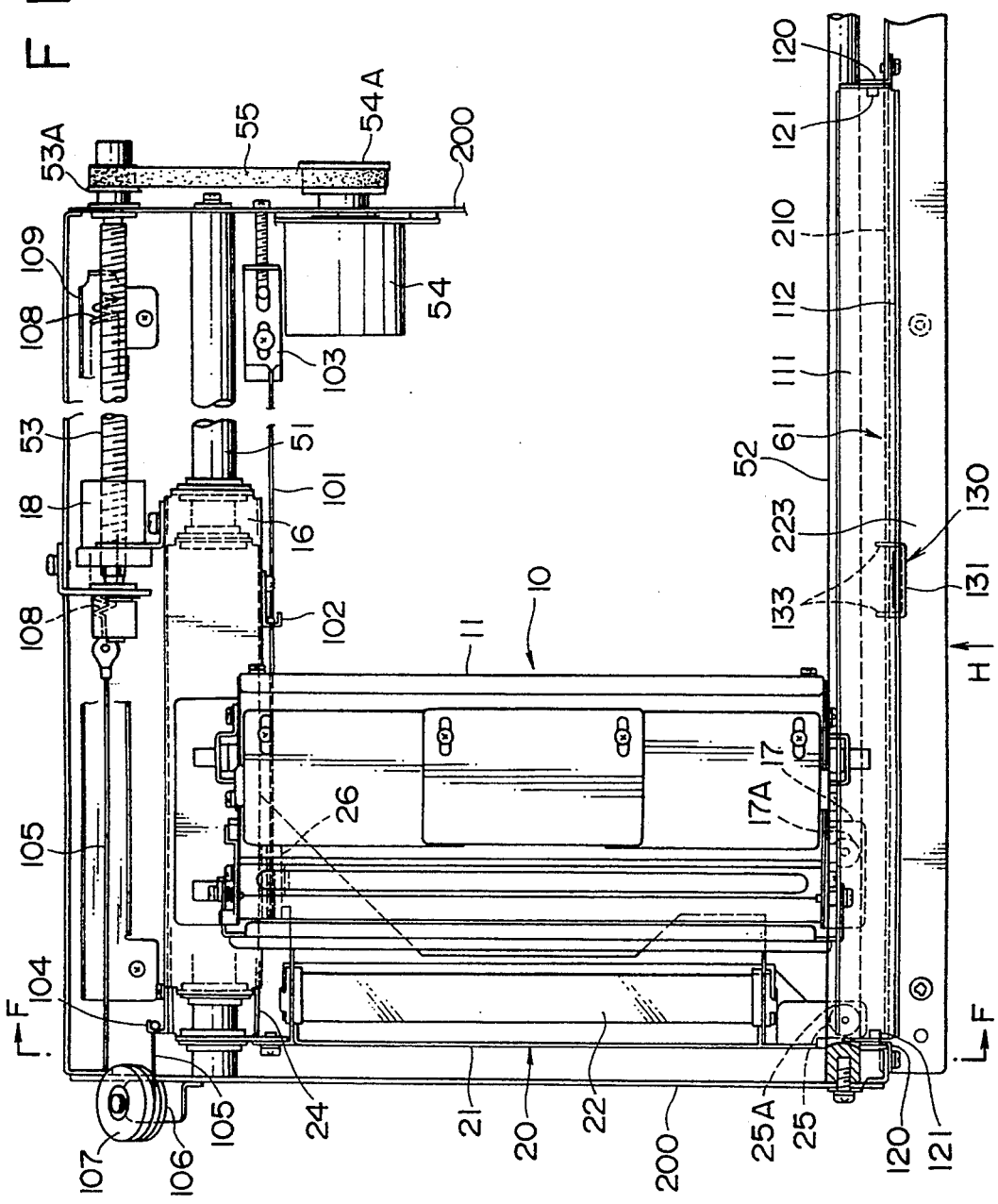
FIG. 4 is a plan view of a scanning unit and a mirror unit.

As shown in FIG. 4, the housing 2 accommodates a pair of spaced guide shafts 51, 52 positioned near opposite lateral sides, respectively, of the chassis 200. The lamp unit 10 and the mirror unit 20 are movably supported on the guide shafts 51, 52 for movement therealong. A ball screw 53 extends parallel to and outwardly of the guide shaft 51. A toothed pulley 53A is fixed to a front end (shown on the righthand side in FIG. 4) of the ball screw 53. Another toothed pulley 54A is mounted on the spindle of a motor 54 attached to a front end (shown on the righthand side in FIG. 4) of the chassis 200. A toothed belt 55 is trained around the toothed pulleys 53A, 54A. When the motor 54 is energized, the ball screw 53 is rotated about its own axis by the toothed pulleys 53A, 54A and the toothed belt 55.

As shown in FIGS. 5, 6, 7, 8, 9, and 10, the reflecting member 12, the halogen lamp 13, the first mirror 14, and the glass cover 15 are supported on the lamp unit frame 11. The reflecting member 12 has a horizontally elongate elliptical shape and is open obliquely upward.

The glass cover 15 and the first mirror 14 have opposite ends projecting from throughholes defined in opposite side plates 11A of the lamp unit frame 11. The projecting ends of the glass cover 15 and the first mirror 14 are pressed against edges of the throughholes by support members 11C fixed respectively to the outer surfaces of the side plates 11A, so that the glass cover 15 and the first mirror 14 are securely mounted in the lamp unit frame 11.

Light emitted from the halogen lamp 13 passes through the glass cover 15 and irradiates the lower surface of the document placed on the document support 3. The first mirror 14, which is positioned below the irradiated portion of the document, reflects the optical document image horizontally to the left in FIG. 10.

Figure 6:
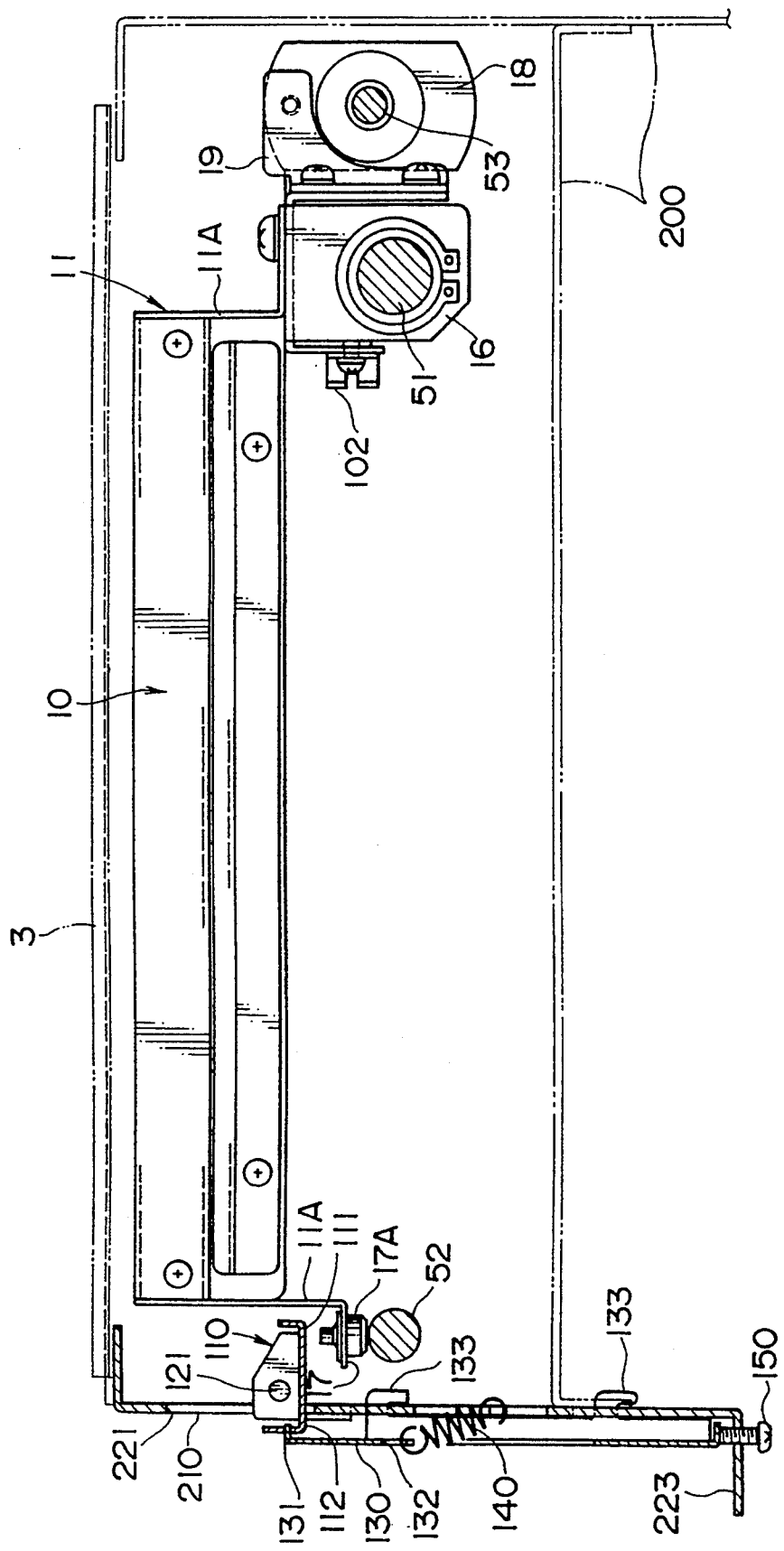
FIG. 6 is a cross-sectional view taken along line A—A of FIG. 5.

A slide bearing 16 is mounted on one side or transverse end of the lamp unit frame 11. The support leg 17 is mounted on the other side of the lamp unit frame 11. The support leg 17 has a lower end bent horizontally. A and a slider 17A is mounted on the bent lower end of the support leg 17, as shown in FIG. 6. A ball nut 18, which is threaded over the ball screw 53, is fixed to an outer surface of the slide bearing 16 by a bracket 19. A hook 102 is fixed to an inner surface of a front end portion of the slide bearing 16.

The slide bearing 16 is slidably fitted over the guide shaft 51 through a bushing. The support leg 17 is slidably placed on the guide shaft 52 through the slider 17A. Therefore, the lamp unit frame 11 is movably supported on the guide shafts 51, 52 through the slide bearing 16 and the support leg 17.

Figure 11:
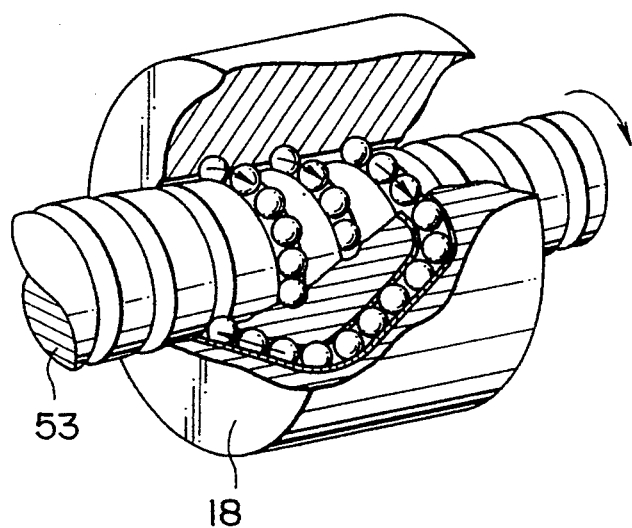
FIG. 11 is a perspective view, partly broken away, of a ball screw.

The ball screw 53 and the ball nut 18 make up a ball screw assembly as shown in FIG. 11. In FIG. 11, a number of balls are circulating disposed in a helical groove defined in the ball screw 53 and a path defined in the ball nut 18, thus providing screw threads. The ball screw 53 and the ball nut 18 thus combined through the balls are subject to low frictional resistance and small backlash therebetween.

When the motor 54 is energized, therefore, the ball screw 53 is rotated about its own axis, causing the lamp unit 10 to reciprocally move on and along the guide shafts 51, 52 over a predetermined stroke.

Because the lamp unit 10 is driven to move through the ball screw assembly, the lamp unit 10 can be moved with high accuracy. Therefore, the mirror unit 20, ganged with the lamp unit 10 can also be moved highly accurately for reading image information highly accurately.

Figure 12:
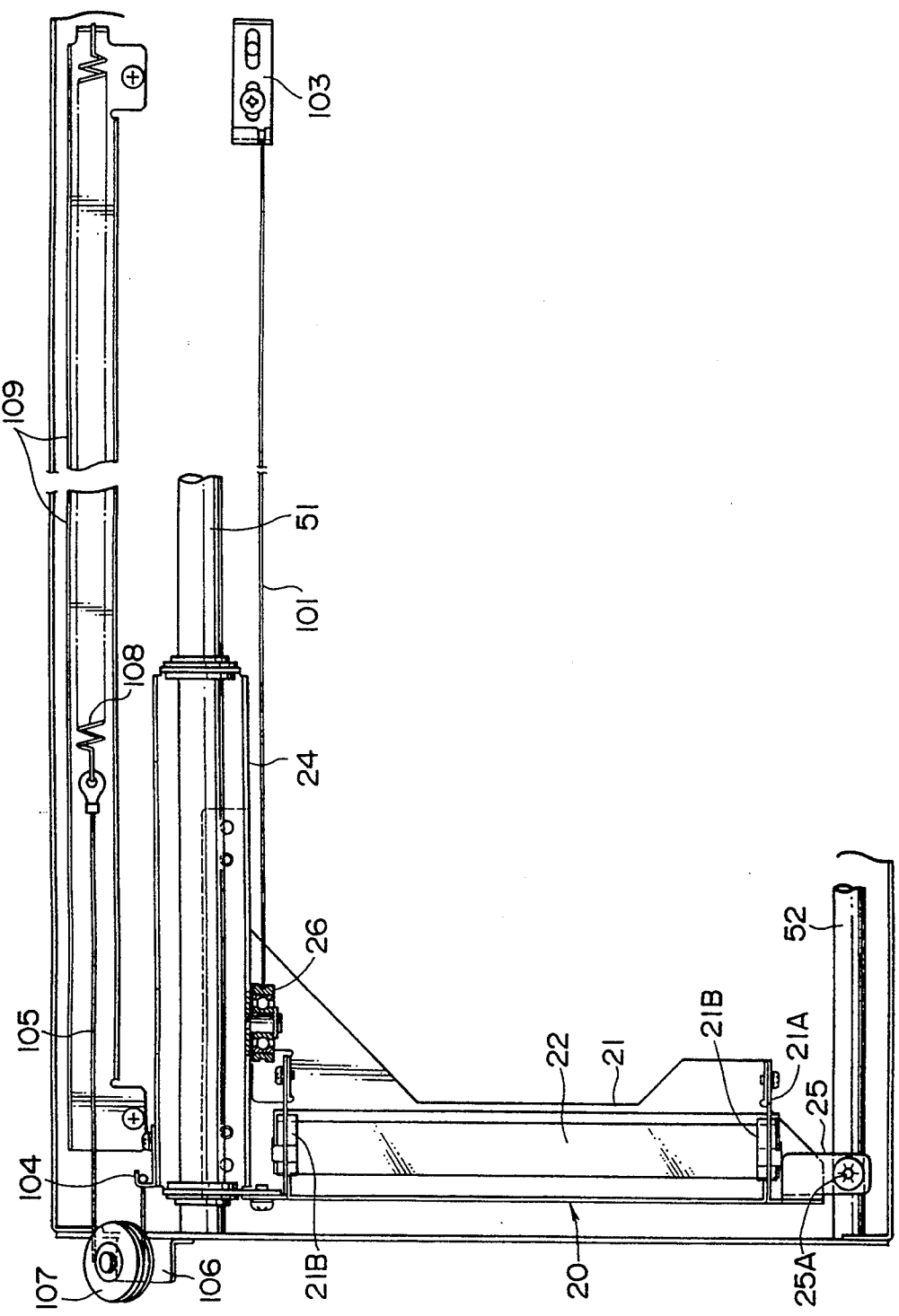
FIG. 12 is a plan view of a mirror unit.
Figure 13:
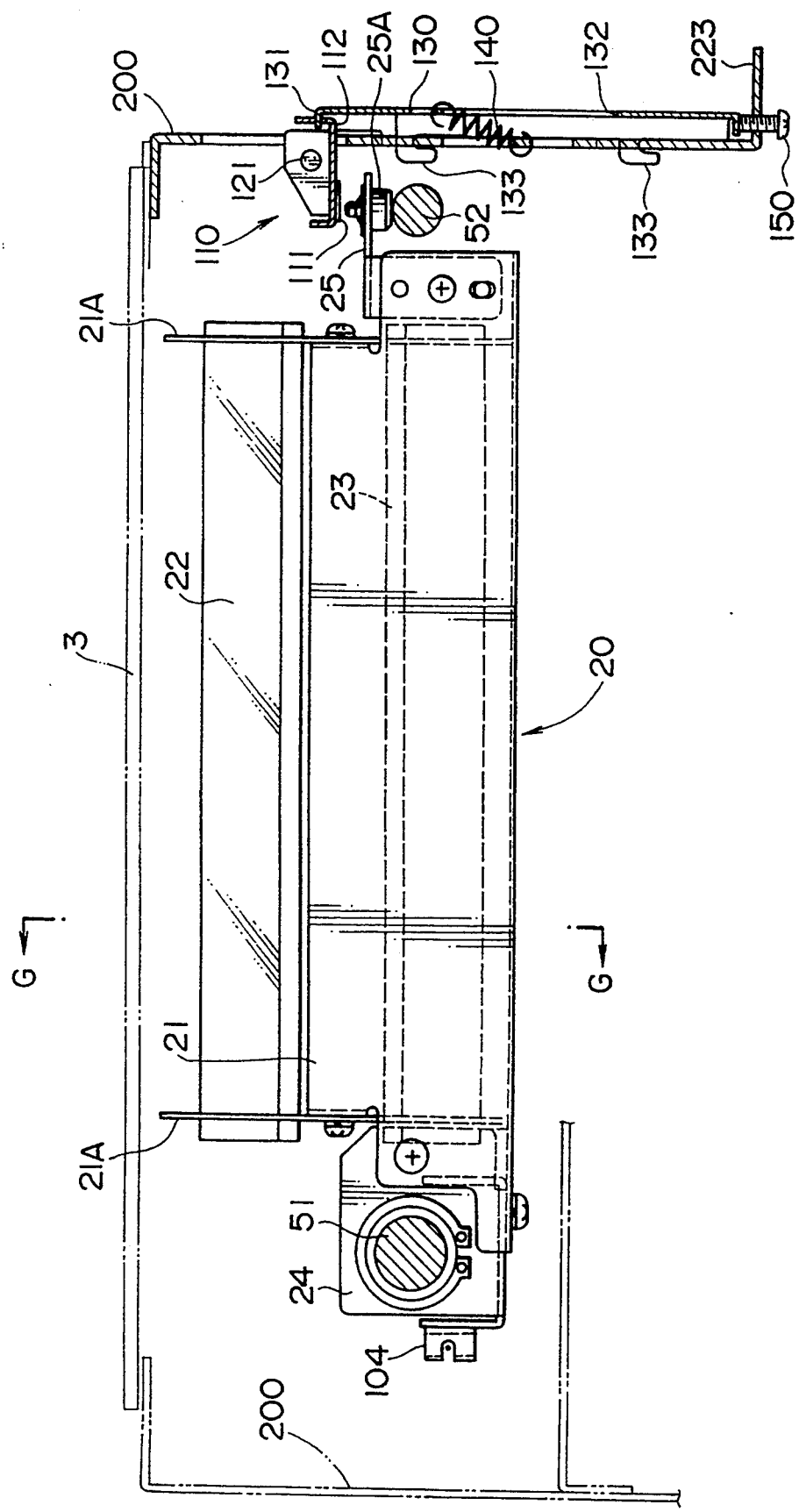
FIG. 13 is a cross-sectional view taken along line F—F of FIG. 4, showing the rear of the mirror unit.
Figure 14:
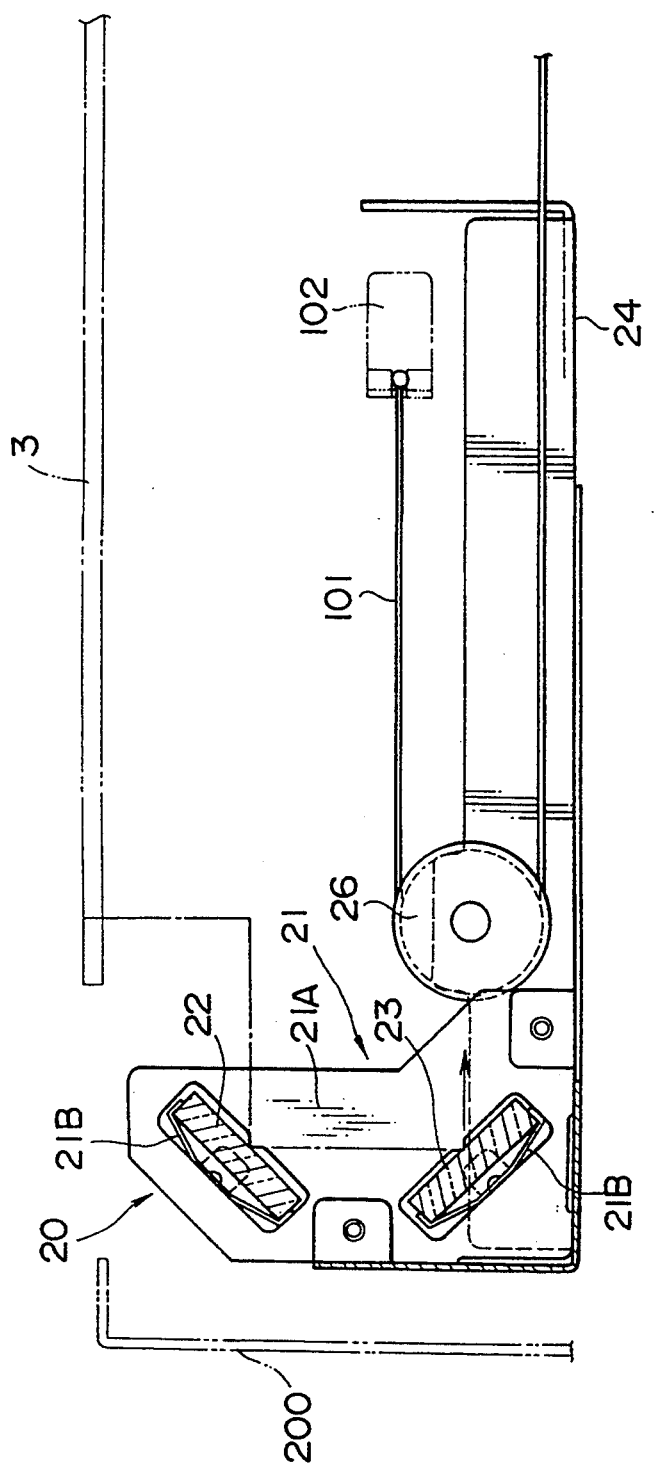
FIG. 14 is a cross-sectional view taken along line G—G of FIG. 13.
Figure 15:
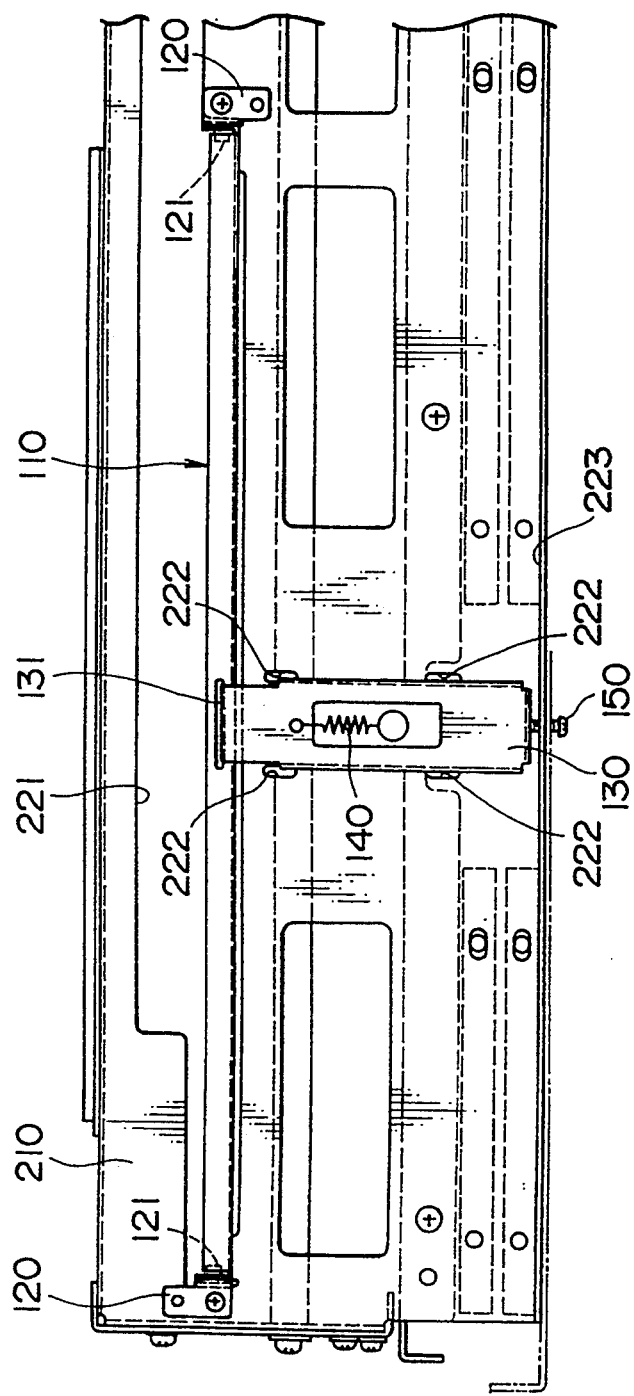
FIG. 15 is a side elevational view of a chassis as viewed in the direction indicated by the arrow H in FIG. 4.

As shown in FIGS. 12, 13 and 14, the mirror unit 20 has a mirror unit frame 21 on which the second and third mirrors 22, 23 are supported.

The first and second mirrors 22, 23 have opposite ends projecting from throughholes defined in opposite side plates 21A of the mirror unit frame 21. The projecting ends of the first and second mirrors 22, 23 supported by support members 21B, are fixed respectively to the outer surfaces of the side plates 21A.

As shown in FIG. 14, the second mirror 22 reflects an optical document image downwardly, and the third mirror 23 reflects the optical document image horizontally to the right.

A slide bearing 24 is mounted on one side or transverse end of the mirror unit frame 21. A support leg 25 is horizontally mounted on the other side of the mirror unit frame 21. The support leg 25 supports a slider 25A. A pulley 26 is rotatably mounted on an inner surface of the slide bearing 24 for rotation about its own axis which extends perpendicularly to the guide shaft 51. A hook 104 is fixed to an outer surface of a rear end of the slide bearing 24.

The slide bearing 24 is slidably fitted over the guide shaft 51 through a bushing. The support leg 25 is slidably placed on the guide shaft 52 through the slider 25A. Therefore, the mirror unit frame 11 is movably supported on the guide shafts 51, 52 through the slide bearing 24 and the support leg 25.

A wire 101 which is trained around the pulley 26, has one end fixed to the hook 102 secured to the slide bearing 16 of the lamp unit 10. The other end of the wire 101 is fixed to a hook 103 fastened to a front end portion of the chassis 200.

A tension wire 105 has one end fixed to the hook 104 secured to the slide bearing 24. The tension wire 105 is trained around a wheel 107 which is rotatably mounted on a rear outer surface of the chassis 200 by a bracket 106. The other end of the tension wire 105 is joined to one end of a tension spring 108 whose other end is fixed to a front end of a hook 109 fixed to the chassis 200.

The mirror unit 20 is normally urged to move to the left in FIGS. 12 and 14 under the bias of the spring 108, connected to the tension wire 105. The tension applied to the mirror unit 20 by the spring 108, is resisted by the wire 101 trained around the pulley 26. Thus, the wire 101 is held under tension.

When the lamp unit 10 is moved to the right in FIG. 4 along the guide shafts 51, 52 by the motor 54 through the ball screw assembly, the end of the wire 101 which is connected to the hook 102 also moves, and the pulley 26 on the mirror unit 20 moves in the same direction as the lamp unit 10 over a distance which is half the distance traversed by the lamp unit 10, against the bias of the tension spring 108. Conversely, when the lamp unit 10 is moved from a righthand position to the left in FIG. 4, the mirror unit 20 also moves in the same direction as the lamp unit 10 over a distance which is half the distance traversed by the lamp unit 10 while the wire 101 is being tensioned under the bias of the tension spring 108.

In this manner, as the lamp unit 10 moves to scan the document, the mirror unit 20 also moves over a distance which is half the distance traversed by the lamp unit 10. The optical path followed by an optical document image, which extends from the document through the first, second, and third mirrors 14, 22, 23 to the sensor unit 30, is of a constant length at all times. Therefore, the optical document image is focused on the photosensitive surface of the color image sensor 33 at all times by the lens 32 of fixed focal point, irrespective of the scanning position of the lamp unit 10.

The tension spring 108 is secured to the hook 109, and hence the chassis 200 at a position that is selected as forwardly as possible in the scanning direction, i.e., to the right in FIGS. 4 and 12. The length of the tension spring 108 is selected such that the distance between the rear end of the tension spring 108, connected to the tension wire 105, and the rear end (shown on the lefthand side in FIGS. 4 and 12) of the chassis 200 Is greater than the stroke of movement of the mirror unit 20 before the tension spring 108 is extended. The tension spring 108 may be of a large length in the longitudinal direction of the chassis 200, with a stroke being left in which the tension spring 108 may be extended, with the stroke being equal to the stroke of movement of the mirror unit 20. The longer the tension spring 108, the smaller the spring constant thereof. Therefore, any change in the bias of the tension spring 108, as it is extended upon movement of the mirror unit 20, is minimized,,and the bias of the tension spring 108 may be rendered substantially constant in the stroke of movement of the mirror unit 20. As a result, any change in the load on the motor 54, which actuates the lamp unit 10 ganged with the mirror unit 20, is also minimized.

As described above, inasmuch as the mirror unit 20 is urged by the tension spring 108 through the tension wire 108 trained around the wheel 107 on the rear end of the chassis 200, the length of the tension spring 108 may be increased without being limited by the distance between the mirror unit 20 and the rear end of the chassis 200. The spring constant of the tension spring 108 may thus be reduced, minimizing any change in the bias of the tension spring 108 as it is extended upon movement of the mirror unit 20. The bias of the tension spring 108 acting on the mirror unit 20 may be substantially uniformized. Consequently, the mirror unit 20 can be moved stably. Since the distance between the mirror unit 20 and the rear end of the chassis 200 can be minimized, the image reading apparatus may be reduced in size.

Detection of a dark signals will be described below.

The lamp unit 10 can be moved a certain distance to the left (FIGS. 1, 4, and 5), i.e., in a direction opposite to the main scanning direction, from its stroke required to scan the document. When the lamp unit 10 is moved to the left, the sensor unit 30 can detect a dark signals.

More specifically, a shutter 60 serving as a shield plate for cutting off the optical path between the document on the document support 3 and the sensor unit 30, is mounted on the lamp unit 10 at its lefthand end.

Figure 5:
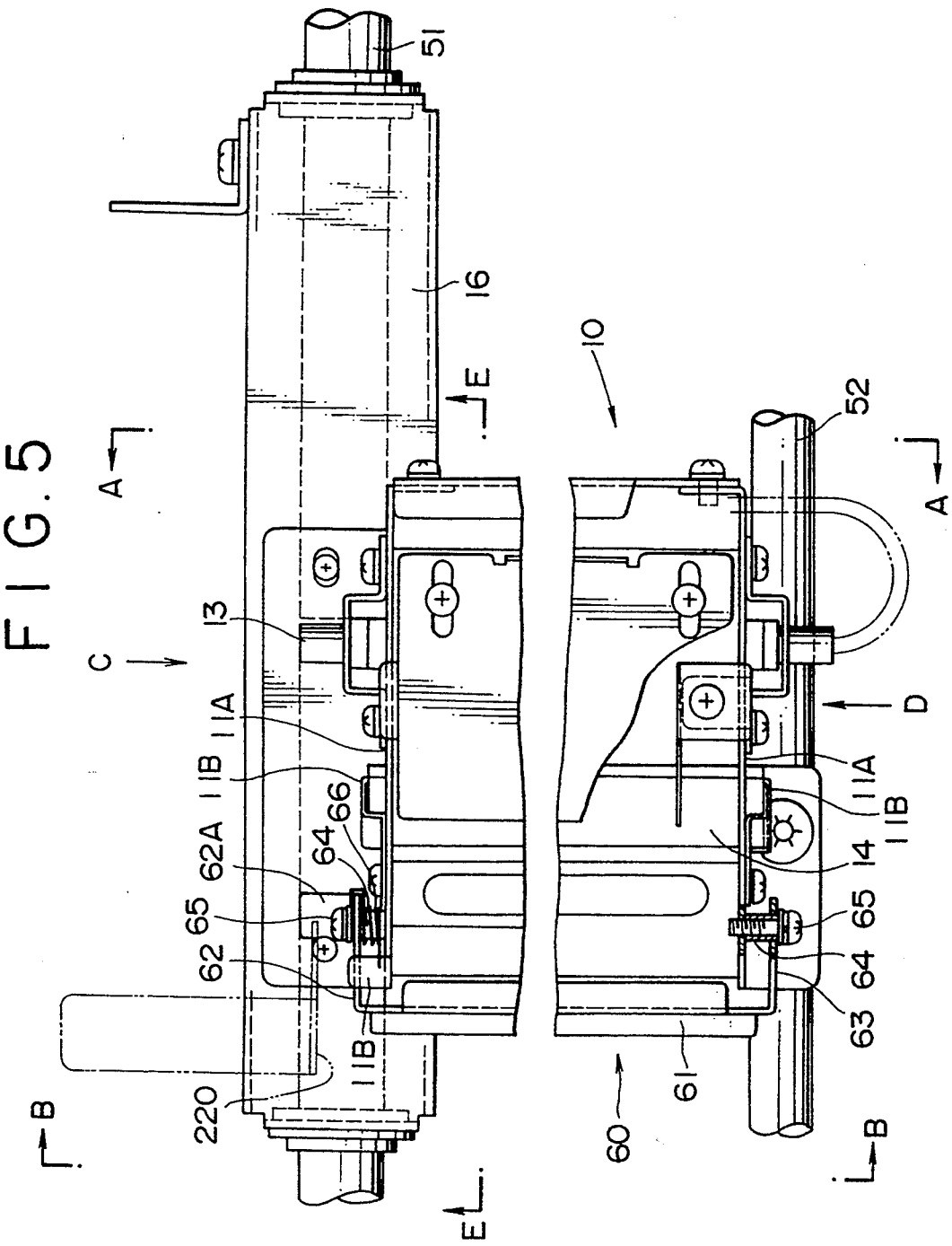
FIG. 5 is a plan view of a lamp unit for irradiating a reflective document.
Figure 7:
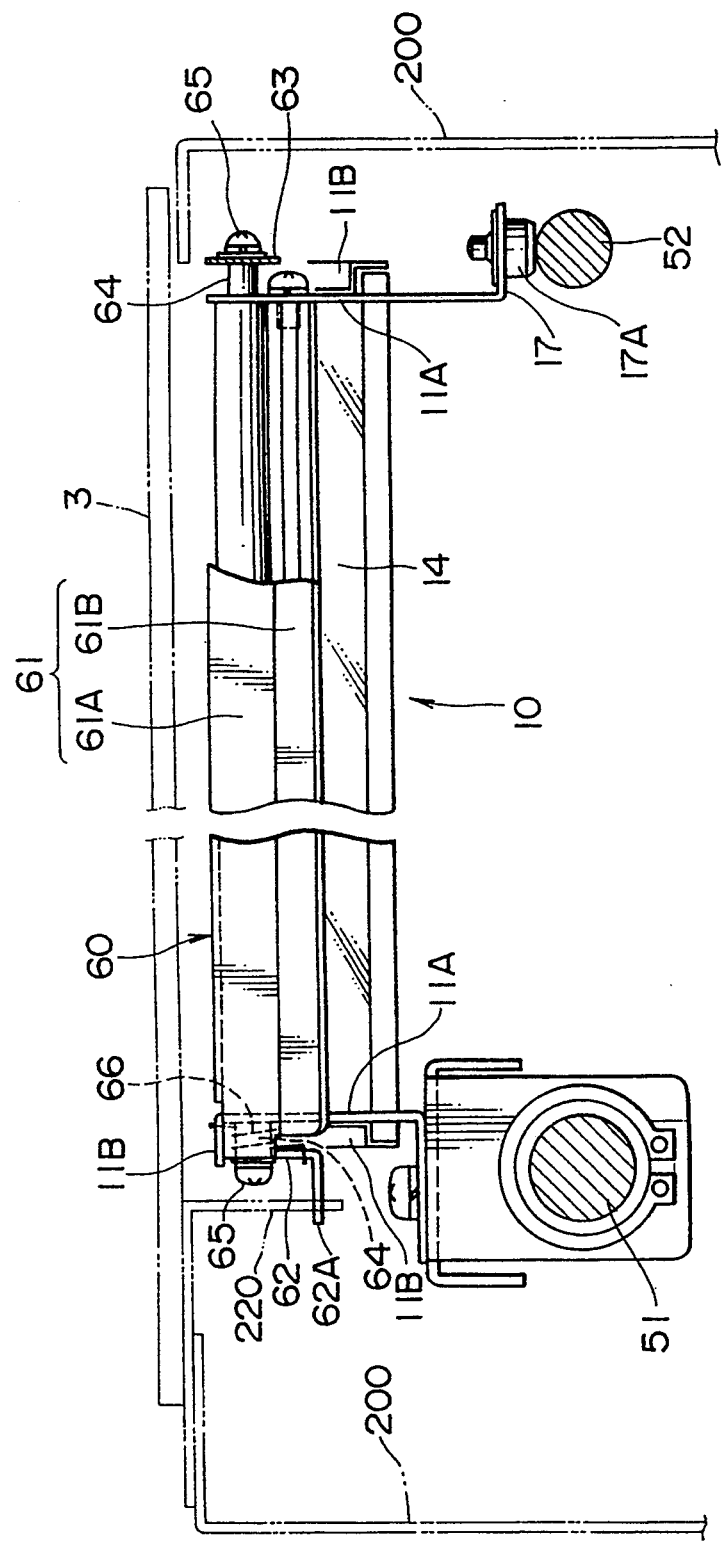
FIG. 7 is a cross-sectional view taken along line B—B of FIG. 5.

The shutter 60 comprises an elongate shield member 61 of an angularly bent cross section extending along the rear end of the lamp unit 10. As shown in FIGS. 5 and 7, the shield member 61 has support arms 62, 63 bent at a right angle from the longitudinal ends, respectively, thereof.

Figure 8:
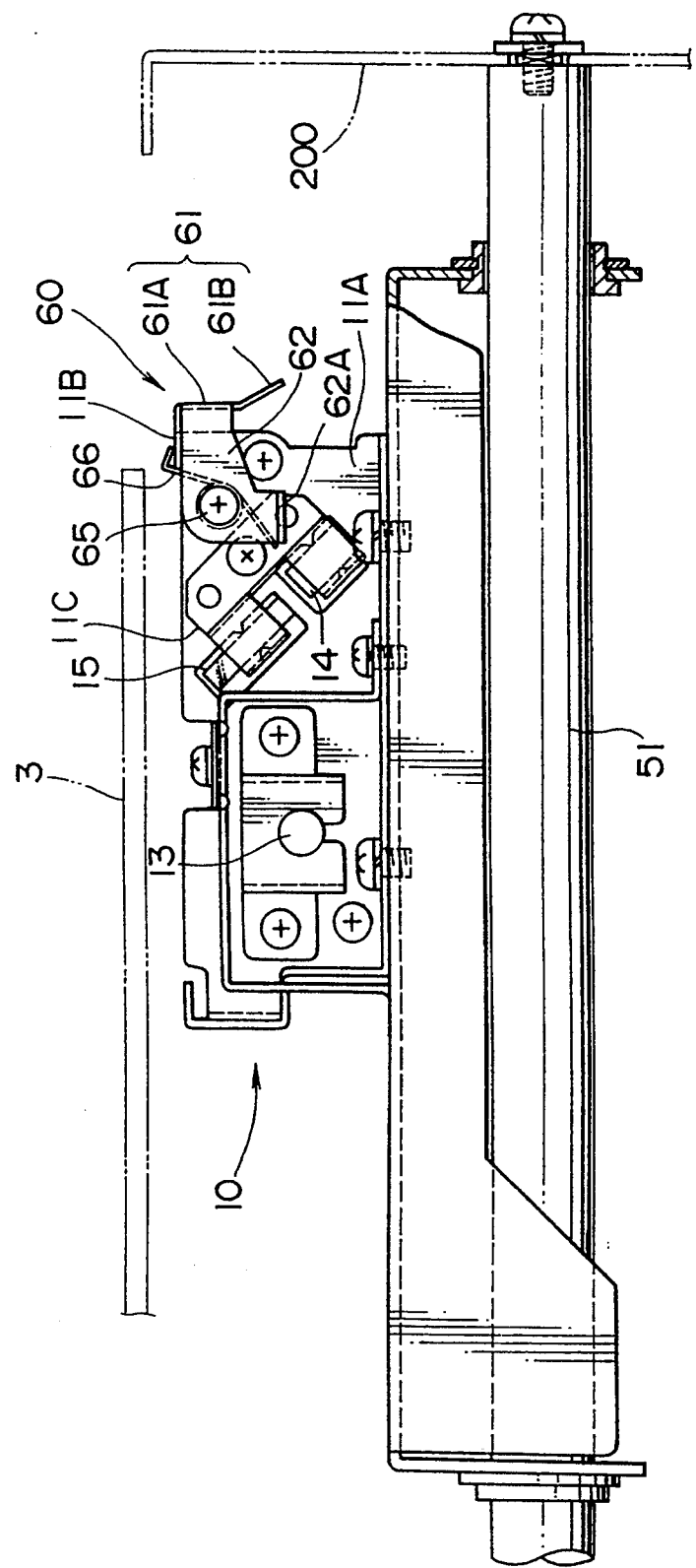
FIG. 8 is a side elevational view as viewed in the direction indicated by the arrow C in FIG. 5.
Figure 9:
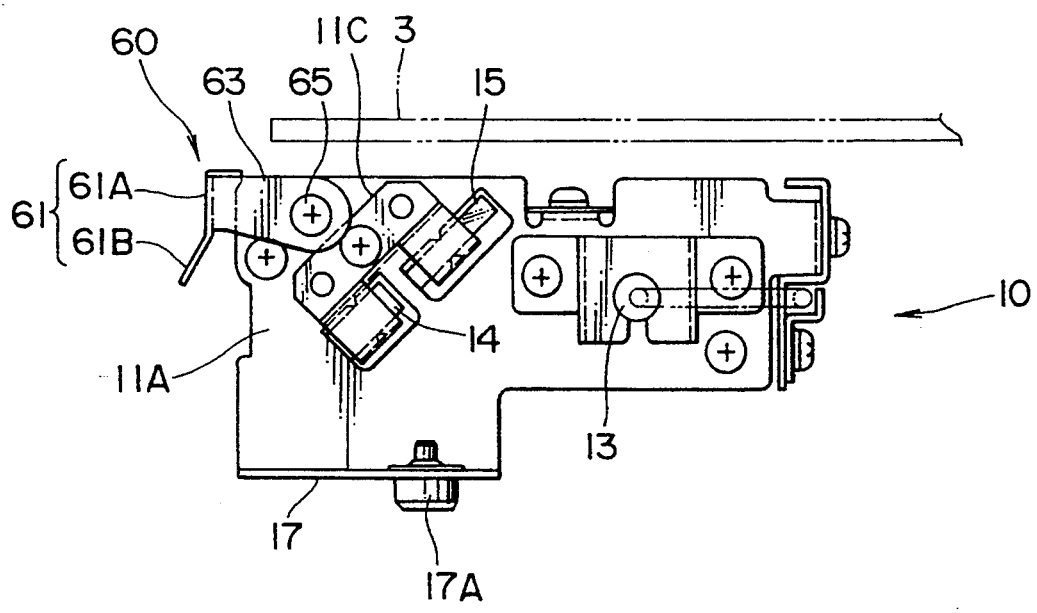
FIG. 9 is a side elevational view as viewed in the direction indicated by the arrow D in FIG. 5.
Figure 10:
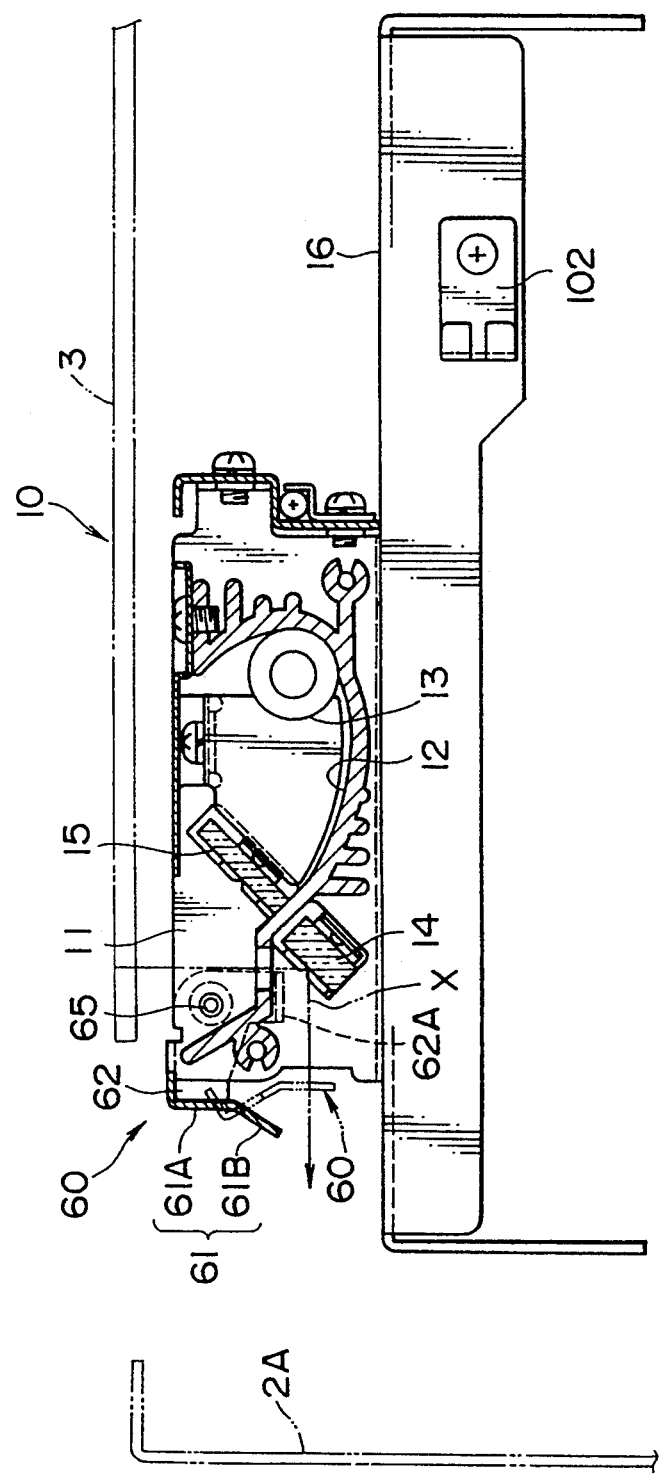
FIG. 10 is a cross-sectional view taken along line E—E of FIG. 5.

The support arms 62, 63 are positioned outwardly of the side plates 11A, respectively, of the lamp unit frame 11, and pivotally connected thereto by screws 65 fitted in respective collars 64. A spring 66 is coiled around the collar 64 which supports the support arm 62. The spring 66 has one end engaging the side plate 11A and the other end engaging the support arm 62 for normally urging the support arm 62 to turn clockwise in FIG. 8. The clockwise movement of the support arm 62 is limited by a stopper tab 11B bent outwardly from an upper edge of the side plate 11A and engaging the support arm 62. When the support arm 62 is engaged by the stopper tab 11B, an upper portion 61A of the shield member 61 extends substantially vertically and a lower portion 61B thereof projects outwardly obliquely at a certain angle, as shown in FIG. 8. When the shutter 60 is turned clockwise about the screws 65 until the lower portion 61B lies substantially vertically as indicated by the imaginary lines in FIG. 10, the lower portion 61B is positioned in and interrupts an optical path X from the first mirror 14 to the second mirror 22.

The support arm 62 has a lower end bent outwardly into a trigger tab 62A which can be displaced to turn the shutter 60 about the screw 65 against the bias of the spring 66.

The chassis 200 has an actuating arm 220 positioned for engaging the trigger tab 62A when the lamp unit 10 is displaced in the direction opposite to the main scanning direction, i.e., to the left (FIG. 5), from the scanning stroke.

As shown in FIGS. 5 and 7, the actuating arm 220 depends vertically from an upper edge of the chassis 200 and has a lower end positioned in the way of the trigger tab 62A. When the lamp unit 10 is displaced to the left from the scanning stroke, the trigger tab 62A is engaged by the actuating arm 220, turning the shutter 60 to cause the shield member 61 to be positioned in the optical path X from the first mirror 14 to the second mirror 22.

The sensor unit 30 can produce a dark signals when the lamp unit 10 is moved to the left from the scanning stroke, prior to a scanning process for reading a document on the document support 3. More specifically, when the lamp unit 10 is displaced to the left from the scanning stroke, the trigger tab 62A is engaged by the actuating arm 220, and the shield member 61 is positioned in the optical path X from the first mirror 14 to the second mirror 22, as described above. The sensor unit 30 can now generate a dark signal without the need for de-energizing the lamp 13. Since the dark signals can be generated simply by turning the shutter 60 into the optical path X, the procedure to produce the dark signal is quick and simple. Hence the scanning process can thereafter be initiated quickly.

In the above embodiment, the shutter 60 is angularly movably mounted on the lamp unit 10. When the lamp unit 10 is displaced to the left from the scanning stroke, the shutter 60 is angularly moved into the optical path X. However, the shutter 60 may be angularly movably supported on the chassis 200, and may be turned into the optical path X by engagement with the lamp unit 10. Alternatively, the shutter 60 may be angularly moved by an independent actuator. The shutter 60 may be fixed to the chassis 200, and may be positioned in the optical path X when the lamp unit 10 is moved toward the shutter 60.

The lamp unit 10 and the mirror unit 20 can be temporarily fastened in position against movement when the image reading apparatus 1 is moved as a whole for shipment or the like. A mechanism for fastening the lamp unit 10 and the mirror unit 20 against movement will be described below.

As shown in FIGS. 4, 6, 13, and 15, the chassis 200 has a side plate 210 adjacent to the guide shaft 52. A presser lever 110 is swingably supported on the side plate 210.

The presser lever 110 is in the form of an elongate plate having a certain width and a length extending over the strokes of movement of the slider 17A of the lamp unit 10 and the slider 25A of mirror unit 20. The presser lever 110 has opposite side edges bent upwardly, and opposite longitudinal ends bent upwardly. Brackets 120 are fixed to the side plate 210 of the chassis 200 and have respective horizontal pins 121 rotatably fitted in the respective upwardly bent longitudinal ends of the presser lever 110. Therefore, the presser lever 110 is supported on the side plate 210 for angular movement about an axis parallel to the guide shaft 52.

When the presser lever 110 lies horizontally, an inner edge portion 111 thereof is positioned upwardly of the guide shaft 52. An outer edge portion 112 thereof projects out of the side plate 210 through a recess 221 defined in the side plate 210. An actuating lever 130, positioned outside of the side plate 210, has on its upper end a hook 131 engaging the upwardly bent edge above the outer edge portion 112 at its longitudinal center.

The actuating lever 130 is of a vertically elongate rectangular shape and has bent peripheral edges. The actuating lever 130 has a vertically elongate rectangular opening 132 defined centrally therein, and also has downwardly extending guide hooks 133 disposed on opposite vertical edges thereof. The guide hooks 133 are loosely fitted in respective guide holes 222 defined in the side plate 210 for vertical movement therein. The actuating lever 130 is normally biased to move downwardly by a spring 140 held under tension between an upper edge of the central opening 132 and the side plate 210. The downwardly biased actuating lever 130 has a lower edge abutting against the upper end of a screw 150 which is threaded upwardly through an outwardly bent flange 223 extending from the lower edge of the side plate 210.

When the screw 150 is turned about its own axis, the upper end thereof is raised or lowered to move the actuating lever 130 vertically, thus angularly moving the presser lever 110. Specifically, when the screw 150 is turned to lift the actuating lever 130 against the bias of the spring 140, the inner edge portion 111 of the presser lever 110 is lowered toward the guide shaft 52, engaging the upper ends of the sliders 17A, 25A downwardly to press the sliders 17A, 25A against the guide shaft 52. On continued turning movement of the screw 150, the sliders 17A, 25A are forcibly pressed against the guide shaft 52 until they are immovable on the guide shaft 52 due to frictional engagement therewith.

When the image reading apparatus 1 is to be moved in its entirety for shipment or the like, therefore, the screw 150 is turned to enable the presser lever 110 to press the sliders 17A, 25A against the guide shaft 52, holding the lamp unit 10 and the mirror unit 20 against movement along the guide shafts 51, 52. The lamp unit 10 and the mirror unit 20 are now prevented from moving due to vibrations or shocks and hence protected from damage or malfunctioning during shipment, for example.

After the image reading apparatus 1 has been moved, the screw 150 is turned backwards to cause the presser lever 11.0 to release the sliders 17A, 25A from the frictional engagement with the guide shaft 52. The lamp unit 10 and the mirror unit 20 are therefore freed for movement along the guide shafts 51, 52.

The sensor unit 30 will be described below.

Figure 16:
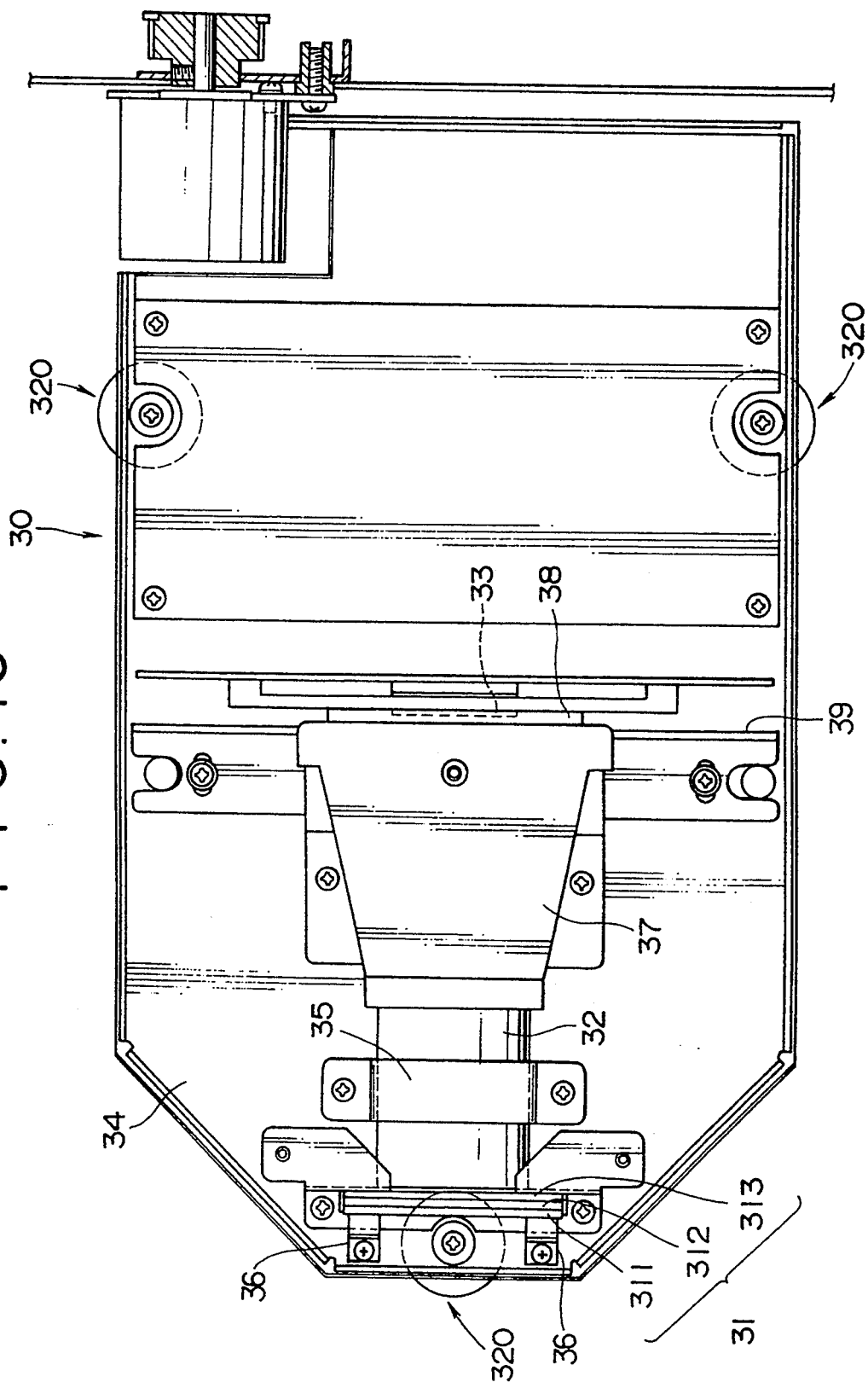
FIG. 16 is a plan view of a sensor unit.
Figure 17:
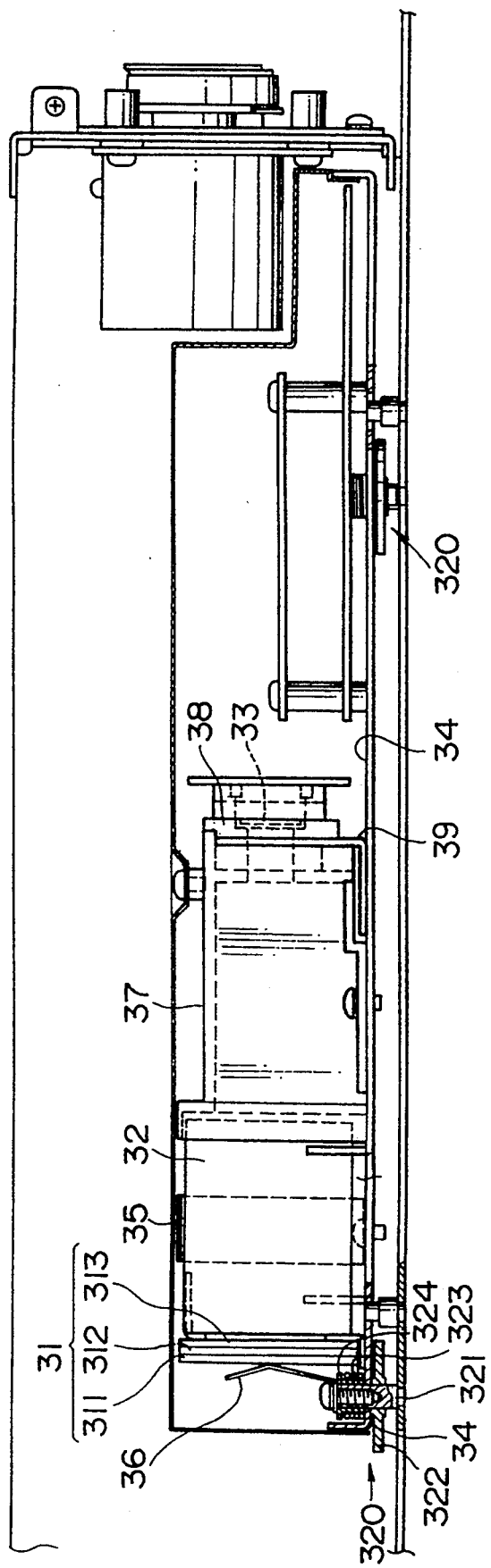
FIG. 17 is a side elevational view of the sensor unit.

As shown in FIGS. 16 and 17, the filter group 31, the lens 32, and the color image sensor 33 are successively arranged in series on the unit base 34.

The lens 32, which has a fixed focal point, is fixedly mounted on the unit base 34 by a U-shaped fastening band 35 surrounding the lens barrel of the lens 32. The lens 32 serves to focus an optical image of a document on the document support 3 onto the photosensitive surface of the color image sensor 33.

The filter group 31 comprises two color correcting filters 311, 312 and a single infrared rejection filter 313 which are successively positioned one against another. These filters 311, 312, 313 are pressed against a front end (shown as a lefthand end in FIGS. 16 and 17) of the lens barrel of the lens 32 by a leaf spring 36 fixed to the unit base 34.

Figure 18:
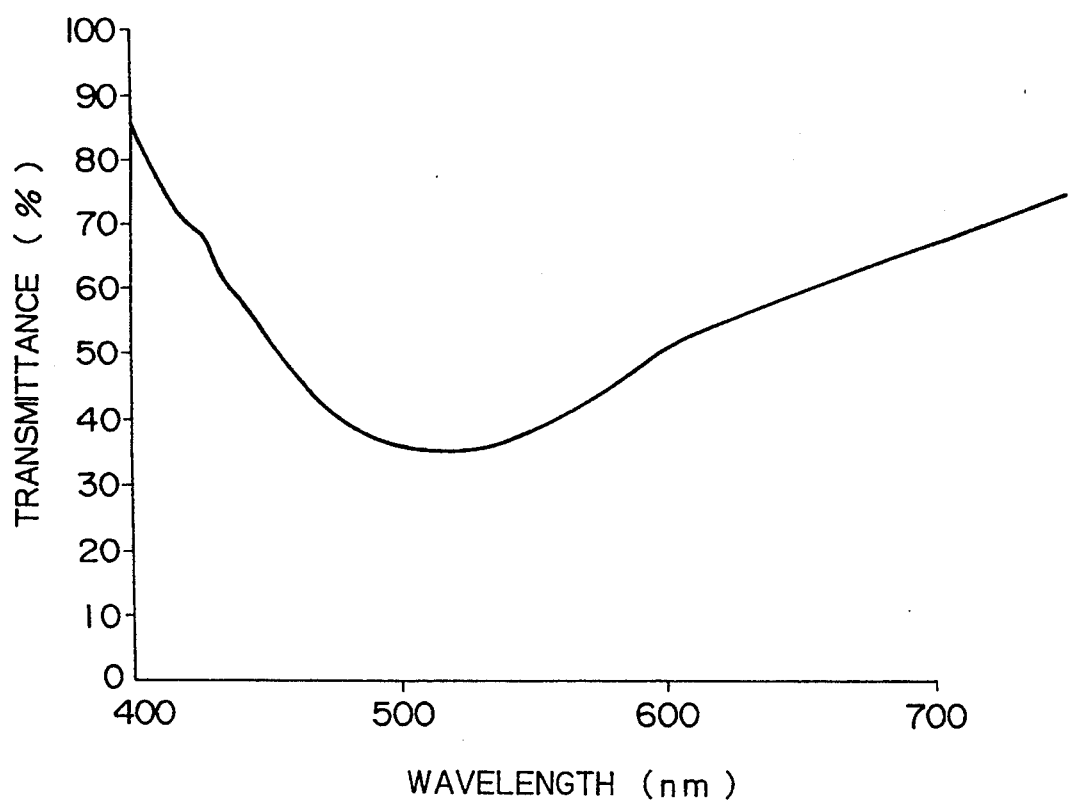
FIG. 18 is a graph showing spectral transmission characteristics of one color correcting filter.
Figure 20:
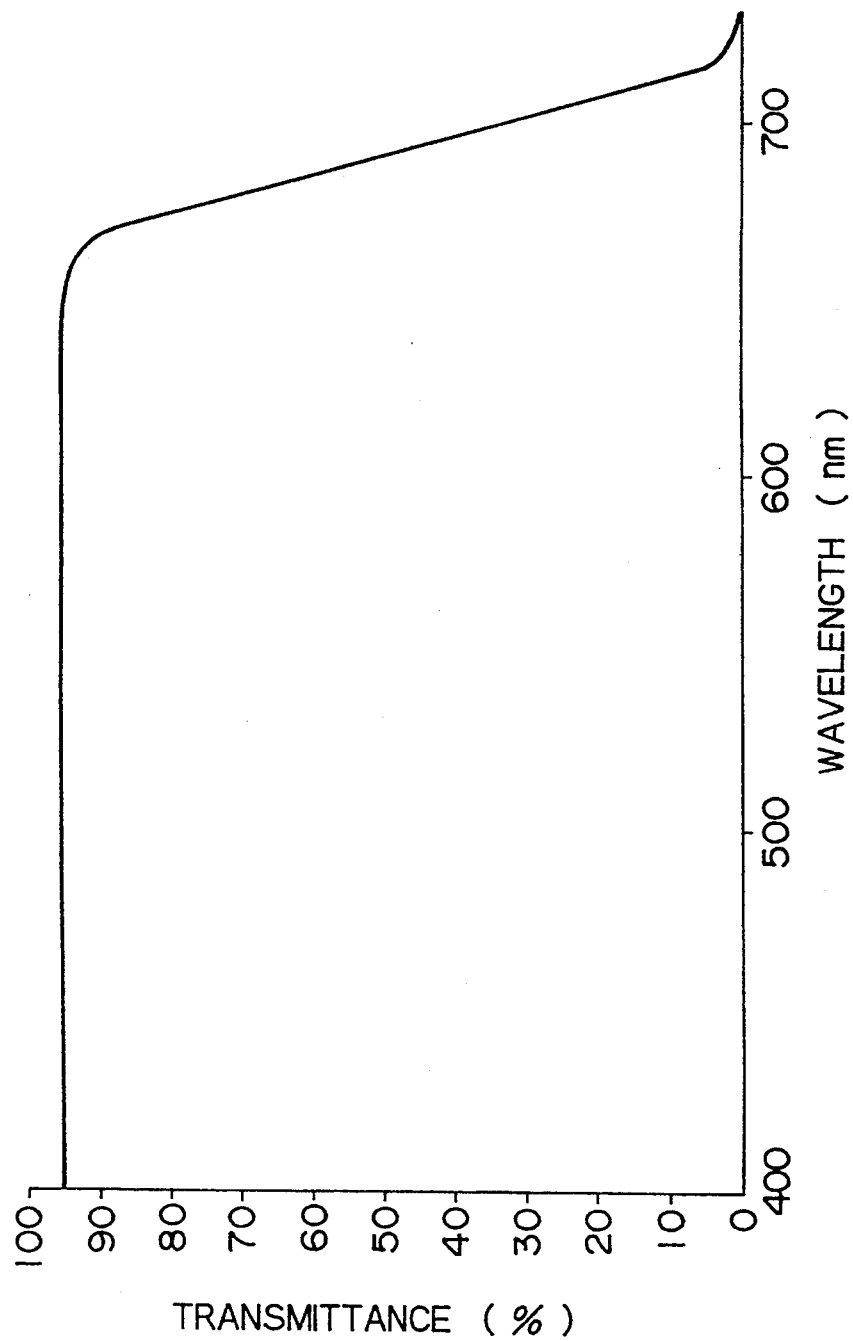
FIG. 20 is a graph showing spectral transmission characteristics of an infrared rejection filter.
Figure 21:
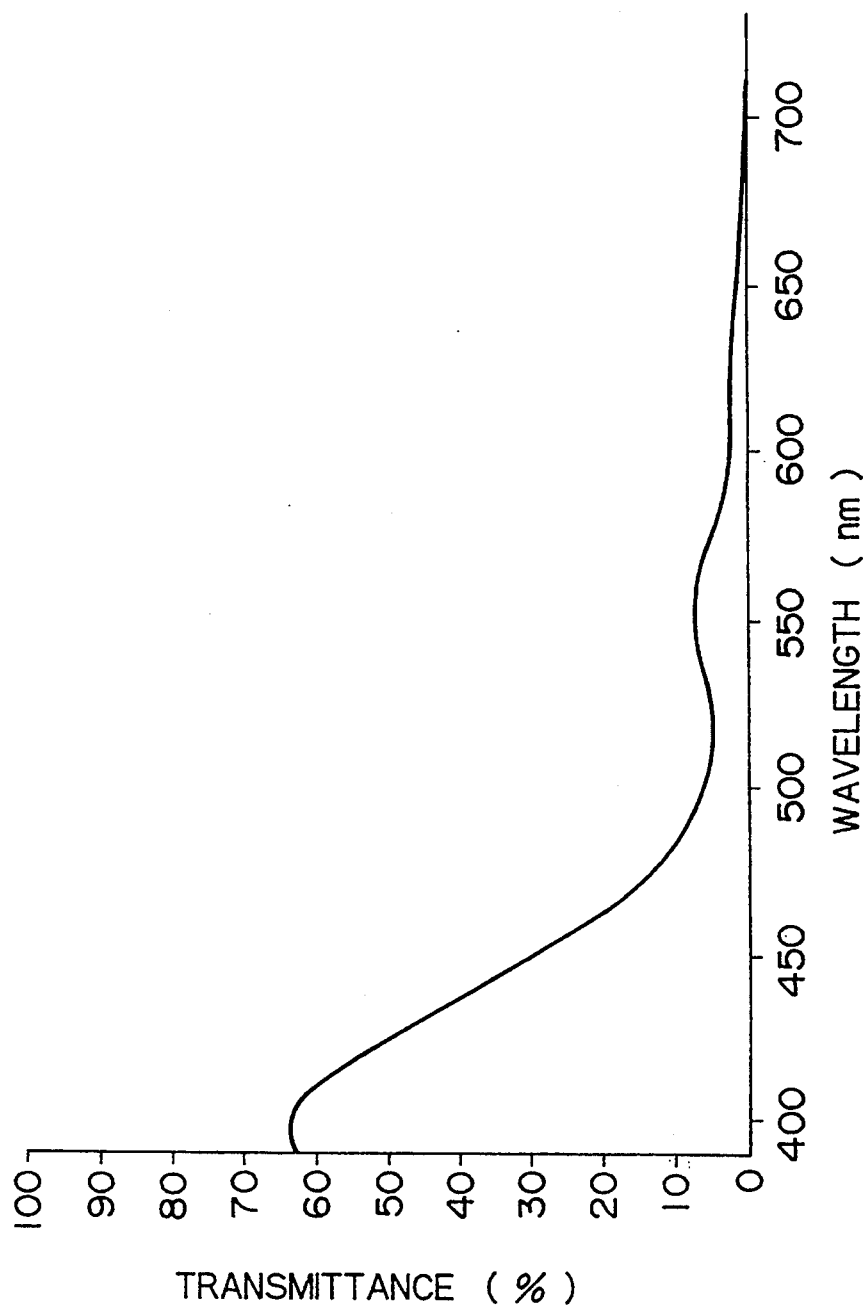
FIG. 21 is a graph showing spectral transmission characteristics of an overall filter group.

The color correcting filter 311 has a low transmittance with respect to green light, as shown in FIG. 18. The color correcting filter 312 has a high transmittance with respect to blue light and low transmittances with respect to other light, as shown in FIG. 19. The infrared rejection filter 313 passes visible light substantially entirely therethrough, but rejects near-infrared radiation, as shown in FIG. 20. The filter group 31 composed of the above three filters 311, 312, 313 has combined spectral transmission characteristics as shown in FIG. 21.

In the color image sensor 33, red (R), green (G), and blue (B) filters are attached to the respective juxtaposed CCD linear sensors of the color image sensor 33. The CCD linear sensors photoelectrically convert the light that has passed through the filters into electric signals, which are produced as output signals of the CCD linear sensors. The color image sensor 33 is mounted on the unit base 34 by a bracket 39.

Figure 22:
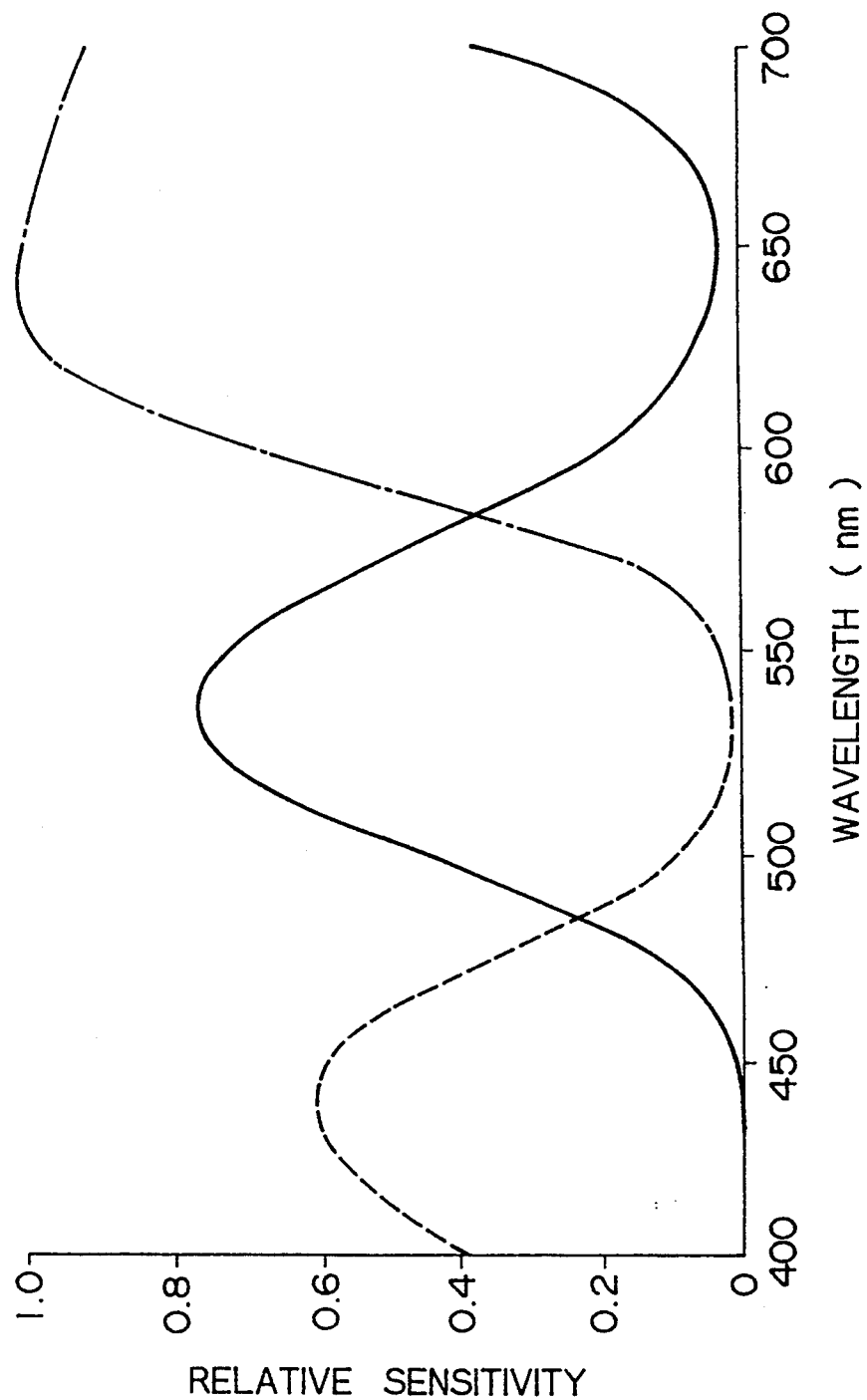
FIG. 22 is a graph showing spectral sensitivity characteristics of CCD linear sensors.

The CCD linear sensors have spectral sensitivity characteristics as shown in FIG. 22. In FIG. 22, the sensitivity of the CCD linear sensor which detects red light is indicated by the dotted-line curve. The sensitivity of the CCD linear sensor, which detects green light, is indicated by the solid-line curve. The sensitivity of the CCD linear sensor, which detects blue light, is indicated by the dot-and-dash-line curve.

An optical path cover 37 is fixedly positioned on the unit base 34 between the lens 32 and the color image sensor 33, The lens 32 has a rear end (shown as a right-hand end in FIGS, 16 and 17) fitted in the front end of the optical path cover 37, The color image sensor 33 is held closely against the rear end of the optical path cover 37 through a resilient shield member 38.

The unit base 34 has three height adjusting mechanisms 320 positioned respectively at an end thereof transversely centrally near the filter group 31, and at opposite transverse side edges thereof near the color image sensor 33.

Each of the height adjusting mechanisms 320 comprises a stud bolt 321 vertically mounted on the chassis 200, an adjusting nut 322 threaded over the stud bolt 321, and a spring 323 positioned above the adjusting nut 323 and disposed around a flanged collar 324 fitted over the stud bolt 321. The spring 323 is retained on the flanged collar 324 against removal.

The unit base 34 is positioned upwardly of the adjusting nuts 322 and beneath the springs 323. The unit base 34 is normally urged against the adjusting nuts 322 by the springs 323 acting on the unit base 34. When the adjusting nuts 322 are turned to move vertically with respect to the respective stud bolts 321, the portions of the unit base 34 which are supported by the stud bolts 321 are vertically displaced for thereby adjusting the vertical position, i.e., the height, of the unit base 34, and hence the sensor unit 30.

Figure 23:
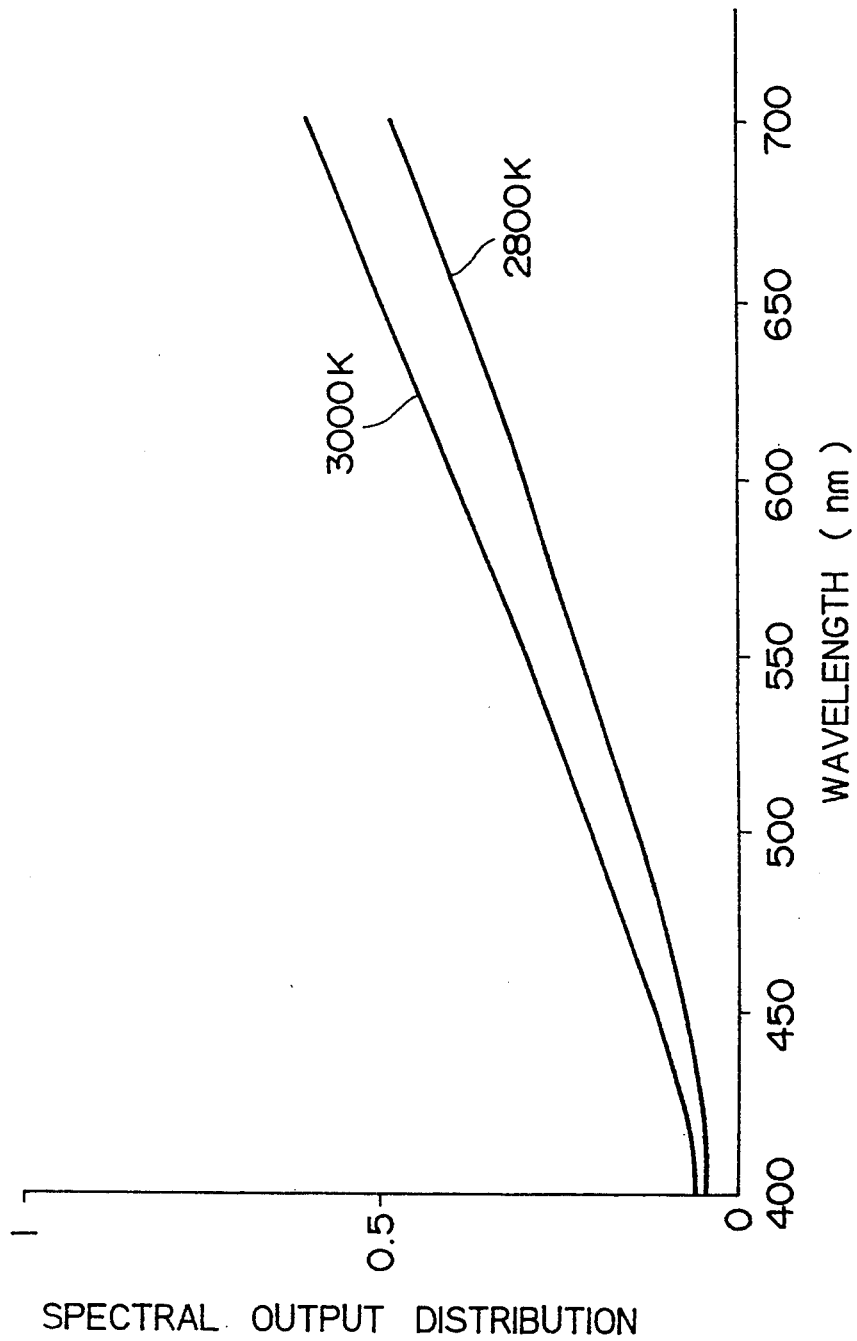
FIG. 23 is a graph showing spectral output characteristics of the halogen lamps.
Figure 24:
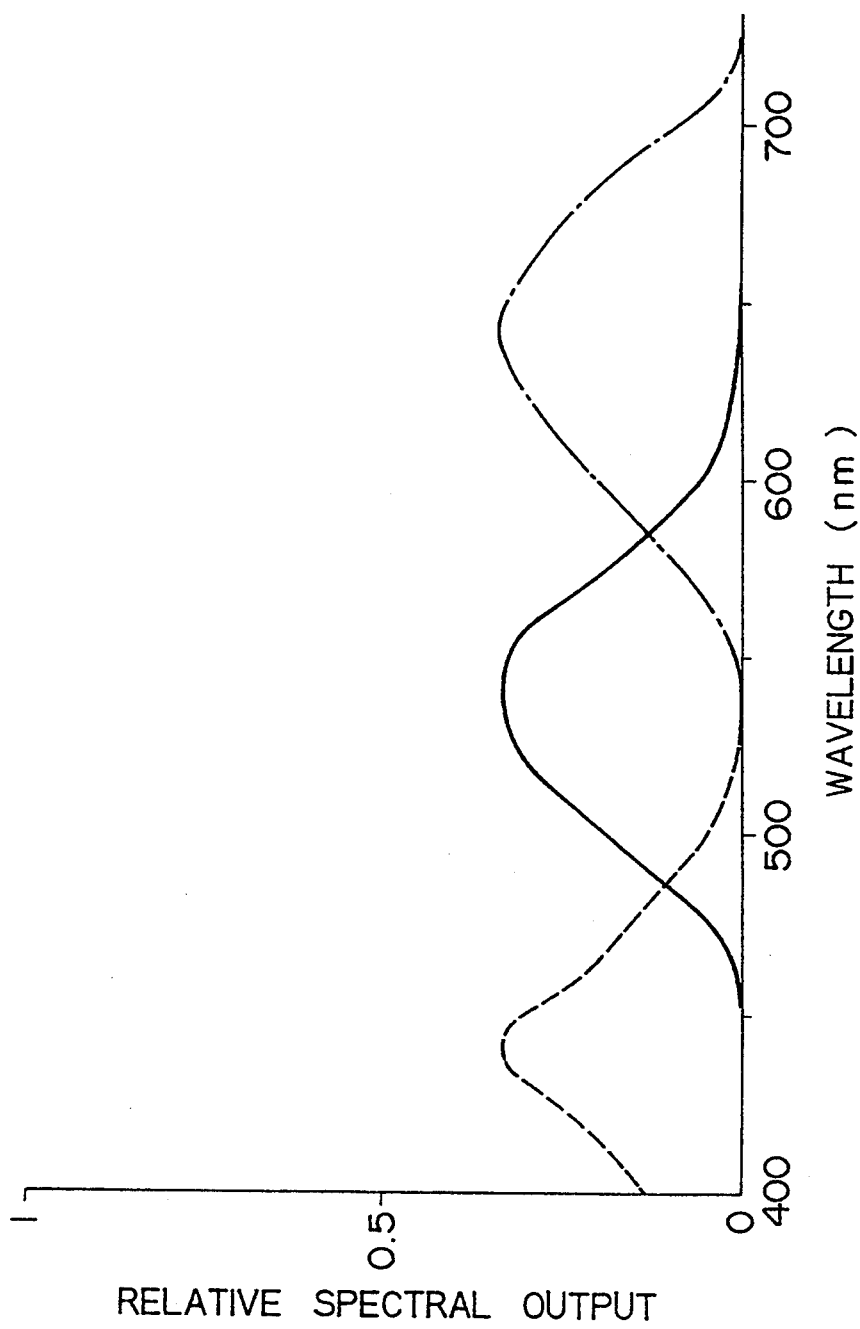
FIG. 24 is a graph showing spectral output characteristics of the image reading apparatus.

The halogen lamps 13, 43 of the respective lamp units 10, 40 have spectral output characteristics, as shown in FIG. 23. The diffusion plate 5 has uniform spectral transmission characteristics in all wavelengths. The spectral output characteristics of the halogen lamps 13, 43 the spectral transmission characteristics of the filter group 31, and the spectral sensitivity characteristics of the color image sensor 33 are combined to allow the image reading apparatus 1 to have spectral output characteristics, as shown in FIG. 24, which provide uniform sensitivity with respect to all the colors of red, green, and blue. In FIG. 24, the dotted-line curve represents the sensitivity of the CCD linear sensor which detects red light. The solid-line curve represents the sensitivity of the CCD linear sensor which detects green light. The dot-and-dash-line curve represents the sensitivity of the CCD linear sensor which detects blue light.

The sensor unit 30 is therefore capable of reading image information based on the light emitted from the halogen lamps 13, 43 of the lamp units 10, 40 while the sensitivities of the color image sensors 33 in the red, green, and blue wavelength ranges are corrected by the filter group 31 so as to be substantially uniform. Since the sensitivities in the respective wavelength ranges are uniformized, the sensor unit 30 can read image information with high accuracy.

Specifically, the color correcting filters 311, 312, for correcting different spectral sensitivities of the CCD linear sensors of the color image sensor 33, are disposed on the entrance side of the lens 32 for uniformizing the sensitivities in the respective wavelength ranges to read image information highly accurately.

The cover 4 will be described below.

Figure 25:
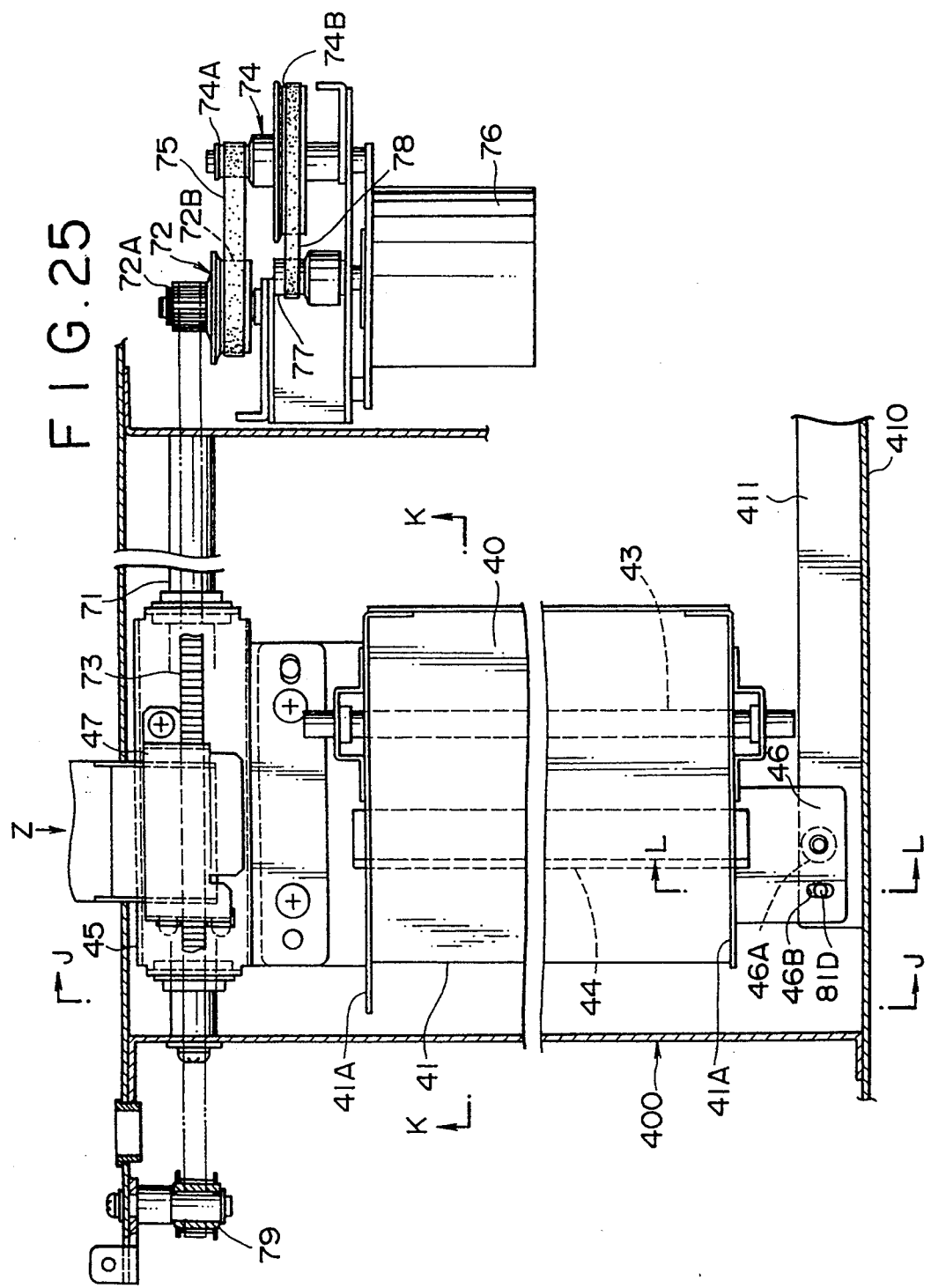
FIG. 25 is a cross-sectional view of a cover.
Figure 26:
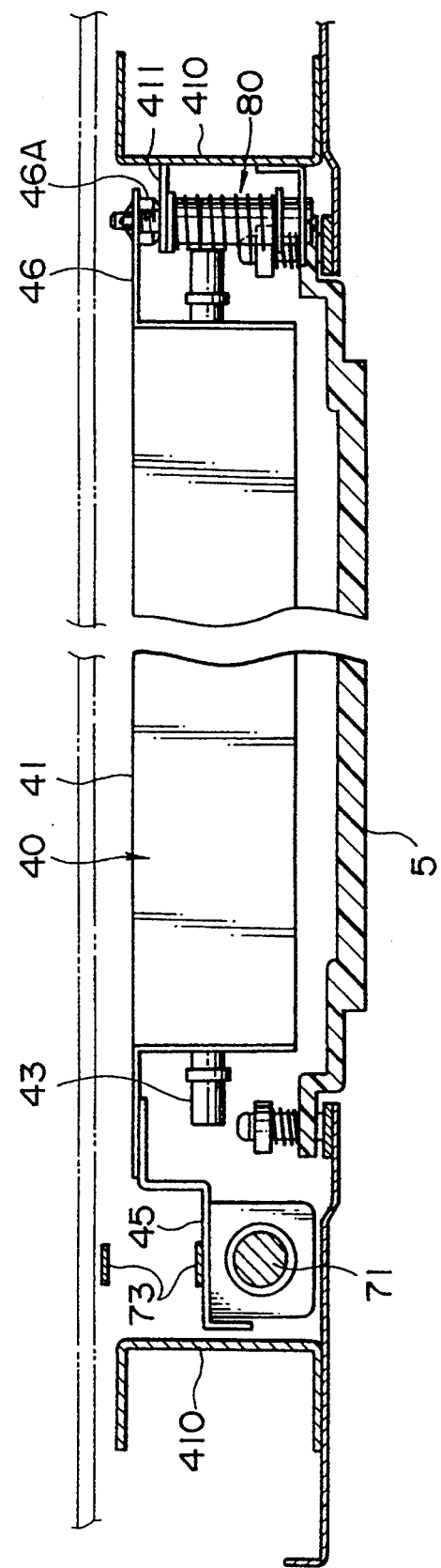
FIG. 26 is a cross-sectional view taken along line J—J of FIG. 25, showing the rear of a lamp unit for irradiating a transmissive document.

As shown in FIGS. 25 and 26, the cover 4 houses a cover frame 400, a guide shaft 71 positioned on one transverse side of the cover frame 400, and a chassis side plate 410 opposite to the guide shaft 71. The chassis side plate 410 has a guide rail 411 bent horizontally inwardly therefrom. The lamp unit 40 is movably supported on the guide shaft 71 and the guide rail 411.

Figure 27:
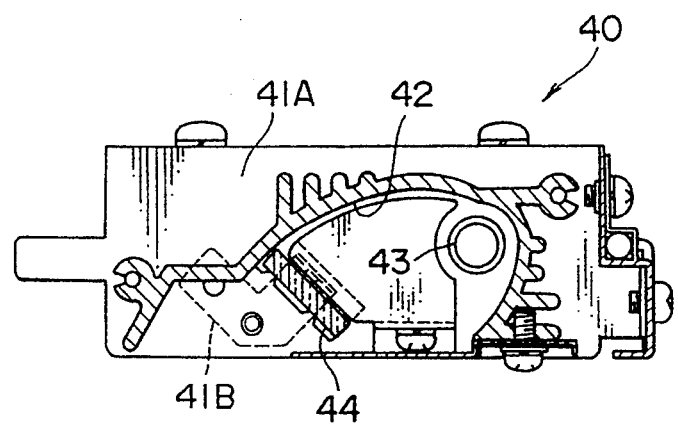
FIG. 27 is a cross-sectional view taken along line K—K of FIG. 25, showing the lamp unit for irradiating a transmissive document.

As also shown in FIG. 27, the reflecting member 42, the halogen lamp 43, and the glass cover 44 are supported by opposite transverse side plates 41A of the lamp unit frame 41.

The glass cover 44 has opposite ends projecting outwardly from the side plates 41A out of throughholes defined therein. The projecting ends of the glass cover 44 are pressed against edges of the throughholes by support members 41B fixed respectively to the outer surfaces of the side plates 41A, so that the glass cover 44 is securely mounted in the lamp unit frame 41.

A slide bearing 45 is mounted on one side or transverse end of the lamp unit frame 41. A support leg 46 extends from the other slide of the lamp unit frame 41. The slide bearing 45 is slidably fitted over the guide shaft 71 through a bushing. The support leg 46 is slidably placed on the guide fall 411 through a slider 46A. The lamp unit frame 41 is therefore horizontally supported for movement along the guide shaft 71 and the guide rail 411.

Figure 28:
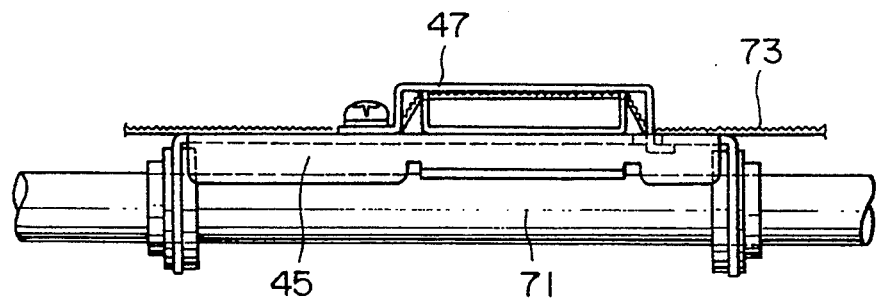
FIG. 28 is a view of a structure which fastens a drive belt, as viewed in the direction indicated by the arrow Z in FIG. 25

Pulleys 72, 79 are rotatably mounted on the cover frame 400 at front and rear positions thereon. A drive belt 73 is trained around the pulleys 72, 79. The drive belt 73 is fixedly attached to the upper surface of the slide bearing 45 by a fastening member 47, as shown in FIG. 28.

The rear pulley 72 comprises a double-wheel pulley having a smaller-diameter wheel 72A around which the drive belt 73 is trained. The rear pulley 72 also has a larger-diameter wheel 72B operatively coupled by a belt 75 to a smaller-diameter wheel 74A of an idler pulley 74, which is also a double-wheel pulley. The idler pulley 74 has a larger-diameter wheel 74B operatively coupled by a belt 78 to a pulley 77 which is fixedly mounted on the shaft of a motor 76 mounted on the cover frame 400. The drive belt 73 can therefore be driven by the motor 76 to move the lamp unit frame 41, and hence the lamp unit 40 along the guide shaft 71. When the lamp unit 40 is actuated, the motor 76 is energized in timed relationship to the motor 54, so that the lamp units 10, 40 can operate in synchronism with each other.

The lamp unit 40 can also be temporarily fastened in position against movement when the image reading apparatus 1 Is moved as a whole for shipment or the like. A mechanism for fastening the lamp unit 40 against movement will be described below.

Figure 29:
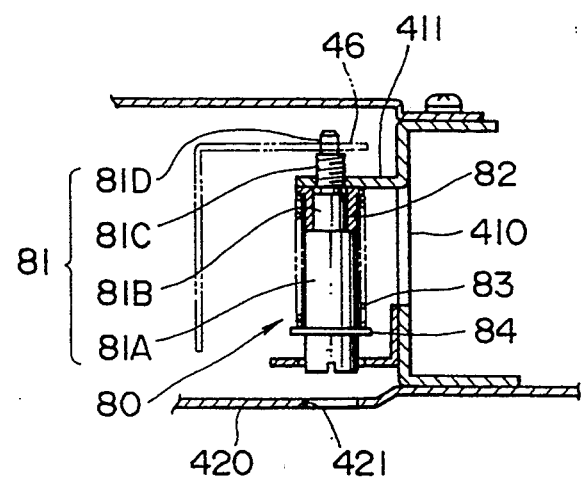
FIG. 29 is an enlarged fragmentary cross-sectional view taken along line L—L of FIG. 25.

As shown in FIG. 29, a fastening mechanism 80 having a fastening pin 81, is mounted on the guide rail 411 at its lefthand end (FIG. 25).

The fastening pin 81 comprises a vertical shank 81A including a small-diameter portion 81B on its upper end. The small-diameter portion 81B has an externally threaded portion 81C on its upper end. A fitting finger 81D is disposed on the upper end of the externally threaded portion 81C. The shank 81A has a screwdriver slot defined in its lower end.

A flanged collar 82 is fitted over the small-diameter portion 81B with its flange held against the guide rail 411. The externally threaded portion 81C is threaded in the guide rail 411. A spring 83 is disposed around the shank 81A between the flange of the collar 82 and an E-ring 84 mounted on the shank 81A near the lower end thereof. The fastening pin 81 is normally urged to move downwardly under the resiliency of the spring 83. When the fastening pin 81 is turned about its own axis by a screwdriver, it is axially moved because of the externally threaded portion 81C threaded in the guide rail 411, between a position in which the fitting finger 81D projects into the path of the support leg 46 of the lamp unit frame 41 and a position in which the fitting finger 81D is retracted out of the path of the support leg 46. The lamp unit frame 41 has a lower opening covered with a lower cover 420, which has a throughhole 421, defined therein, in alignment with the fastening pin 81 for insertion of a screwdriver therethrough.

The support leg 46 has a hole 46B (see FIG. 25), defined therein, for receiving the fitting finger 81D when the lamp unit 40 is in a standby position out of its scanning stroke.

When the lamp unit 40 is in the standby position, the fastening pin 81 is turned by a screwdriver so as to axially move until the fitting finger 81D is inserted into the hole 46B in the guide rail 411. With the fitting finger 81D inserted in the hole 46B, the lamp unit 40 is held immovable on the guide shaft 71.

At the time the image reading apparatus 1 is moved for shipment or the like, the lamp unit 40 is brought into the standby position. The fastening pin 81 is turned so that it is axially moved until the fitting finger 81D is fitted in the hole 46B. The lamp unit 40 can now be fixed in the standby position against movement due to shocks or vibrations as during shipment of the image reading apparatus 1.

After the image reading apparatus 1 has been moved, the fastening pin 81 is turned back to retract the fitting finger 81D out of the hole 46B and hence out of the path of the lamp unit frame 41. The lamp unit 40 is now ready to move from the standby position along the guide shaft 71.

Accordingly, the lamp unit 40 can be fastened or unfastened quite easily without attaching or removing separate screws or fastening pins, and it is not necessary to keep those separate screws or fastening pins in storage.

Figure 30:
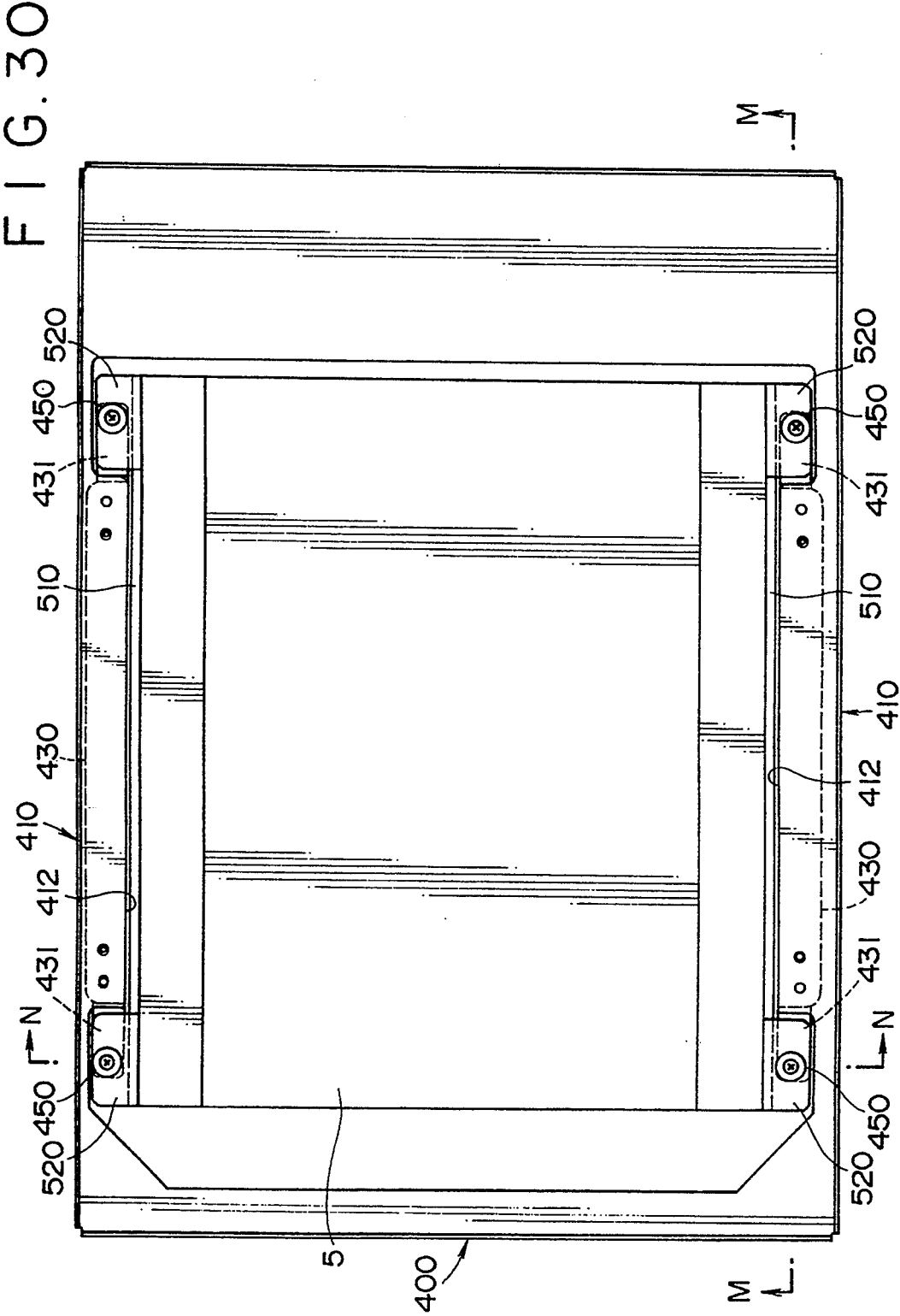
FIG. 30 is a plan view of a diffusion plate.
Figure 31:
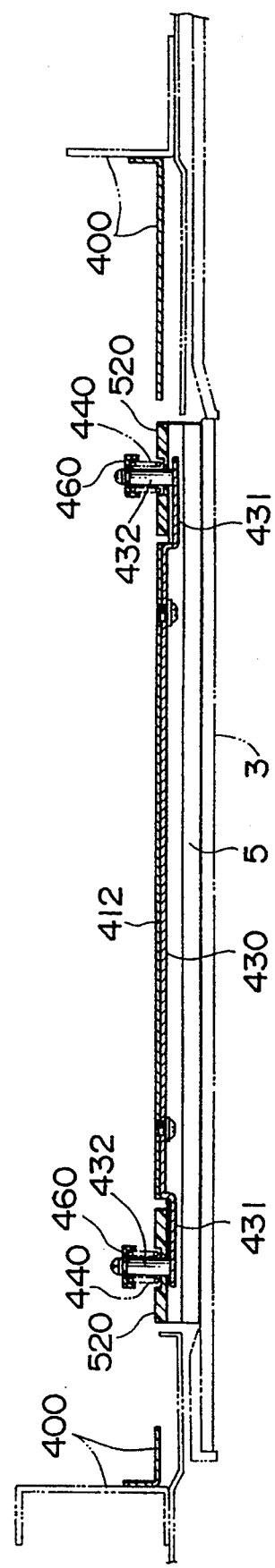
FIG. 31 is a cross-sectional view taken along line M—M of FIG. 30.
Figure 32:
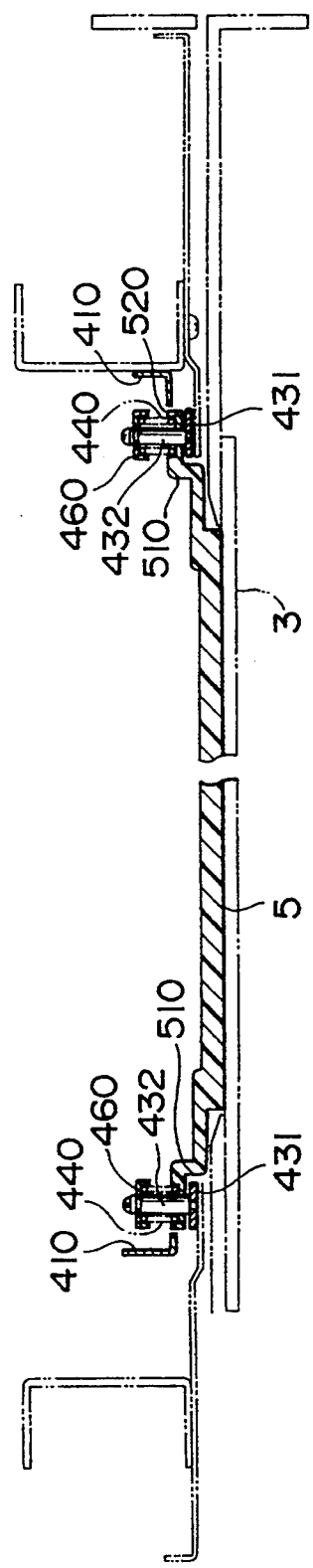
FIG. 32 is a cross-sectional view taken along line N—N of FIG. 30.

The diffusion plate 5 is installed on the cover 4 as follows:

The diffusion plate 5 is of a rectangular shape similar to the document support 3. As shown in FIGS. 30, 31, and 32, the diffusion plate 5 has holder arms 520 on its respective four corners. The holder arms 520 are supported on support members 430 fixed to an inner frame 400 of the cover 4.

The inner frame 400 has opposite side frames 410 each having an L-shaped cross section with Its lower edge projecting inwardly. The side frames 410 have respective longitudinally central support flanges 412 projecting inwardly. The support members 430 are fixed to the respective lower surfaces of the support flanges 412.

The support members 430 have downwardly stepped holders 431 on their opposite ends projecting beyond the support flanges 412, with the holders 431 being lower than the portions of the support members 430 which are fixed to the support flanges 412. Support pins 432 are vertically mounted on the respective holders 431.

The diffusion plate 5 has opposite edges 510 extending upwardly, and the holder arms 520 are upwardly stepped and project laterally from the edges 510 at the four corners of the diffusion plate 5. The holder arms 520 are overlappingly positioned on the holders 431, with the support pins 432 being loosely fitted in the respective holder arms 520.

Figure 33:
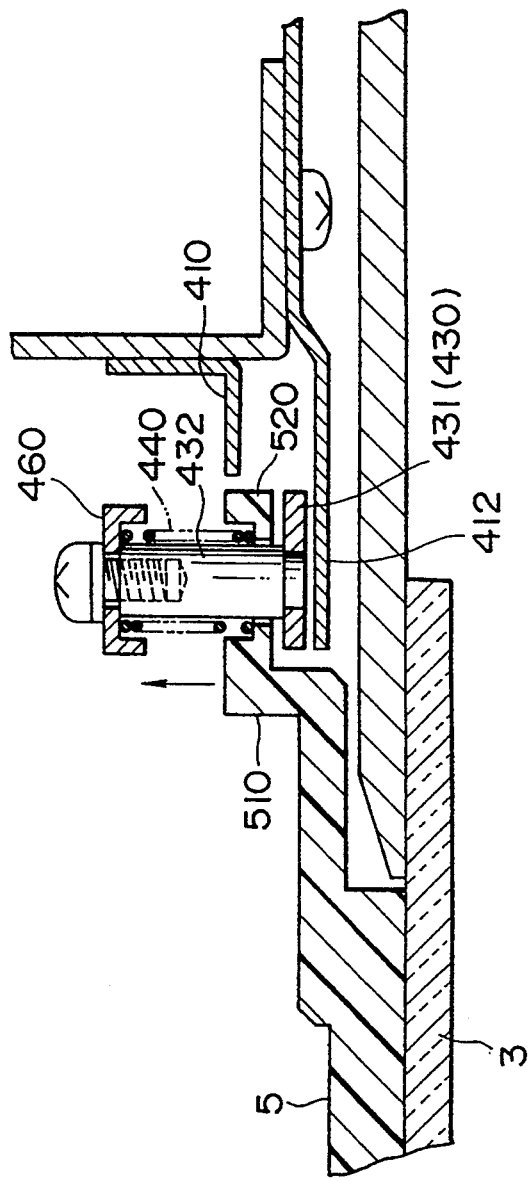
FIG. 33 is an enlarged fragmentary cross-sectional view of a support pin and related parts.

As shown in FIG. 33, a coil spring 440 is disposed around each of the support pins 432, and a washer 460 larger in diameter than the coil spring 440 is fixed to the upper end of the support pin 432. The coil spring 440 acts between the holder arm 520 and the washer 460 for normally urging the holder arm 520 downwardly toward the holder 431.

Therefore, the diffusion plate 5 is resiliently supported on the support members 430 while its four corners are independently movable upwardly against the bias of the respective coil springs 440. When the cover 4 is closed, i.e., placed over the document support 4, the lower surface of the diffusion plate 5 is forcibly held against the upper surface of the document support 3, with the coil springs 440 being resiliently compressed. The diffusion plate 5 is therefore pressed closely against the document support 3 under the resilient forces of the coil springs 440 under compression.

When a document placed on the document support 3 is to be read, the document can be pressed closely against the document support 3 by the diffusion plate 5.

Specifically, since the four corners of the diffusion plate 5 are independently supported for upward movement against the bias of the coil springs 440, the diffusion plate 5 can neatly hold the document in its entirety even if the document is relatively thick or its upper surface is not flat. As the diffusion plate 5 is uniformly held against the document through independent height adjustment of the four corners thereof, the document is prevented from being partly lifted off the document support 3, and is securely held in close contact with the document support 3.

Consequently, the document is neatly and accurately kept in contact with the document support 3 by the diffusion plate 5, while the document is being read.

The hinged structure of the cover 4 will be described below.

As shown in FIGS. 34, 35, 36, and 37, one end of the cover frame 400 is angularly movably supported by a pivot shaft 6 on two laterally spaced brackets 230 fixed to the chassis 200 in the housing 2. The other end of the cover frame 400 is therefore angularly movable toward and away from the housing 2 to close and open the cover 4.

Figure 34:
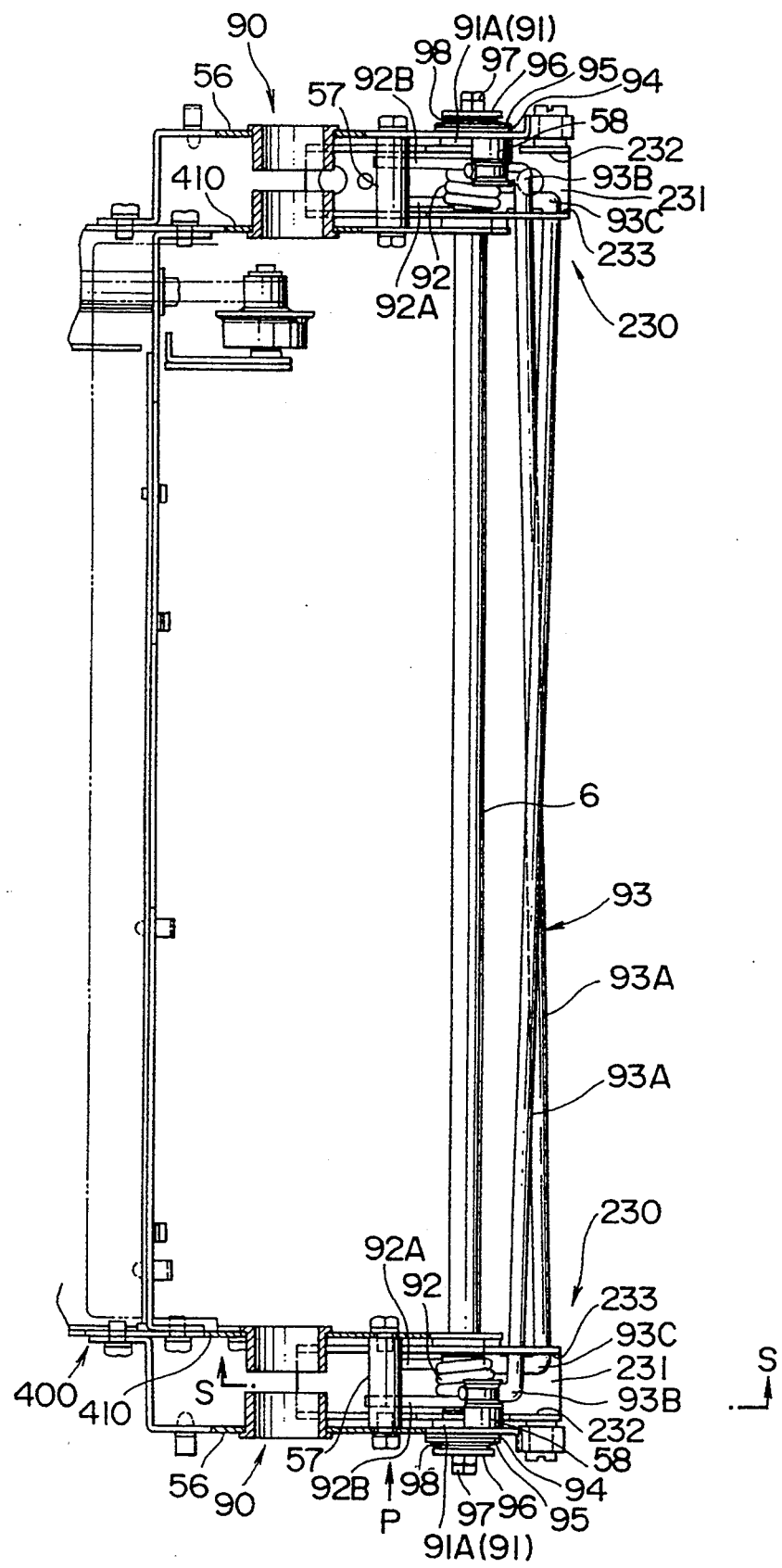
FIG. 34 is a plan view of the cover frame which is mounted on an apparatus housing.

The cover frame 400 has a pair of laterally spaced opposite side plates 410. Support plates 56 are attached to and spaced from outer surfaces of the side plates 410 near the hinged end of the cover frame 400. The support plates 56 and the side plates 410 provide joint structures 90, as shown in FIG. 34.

Figure 36:
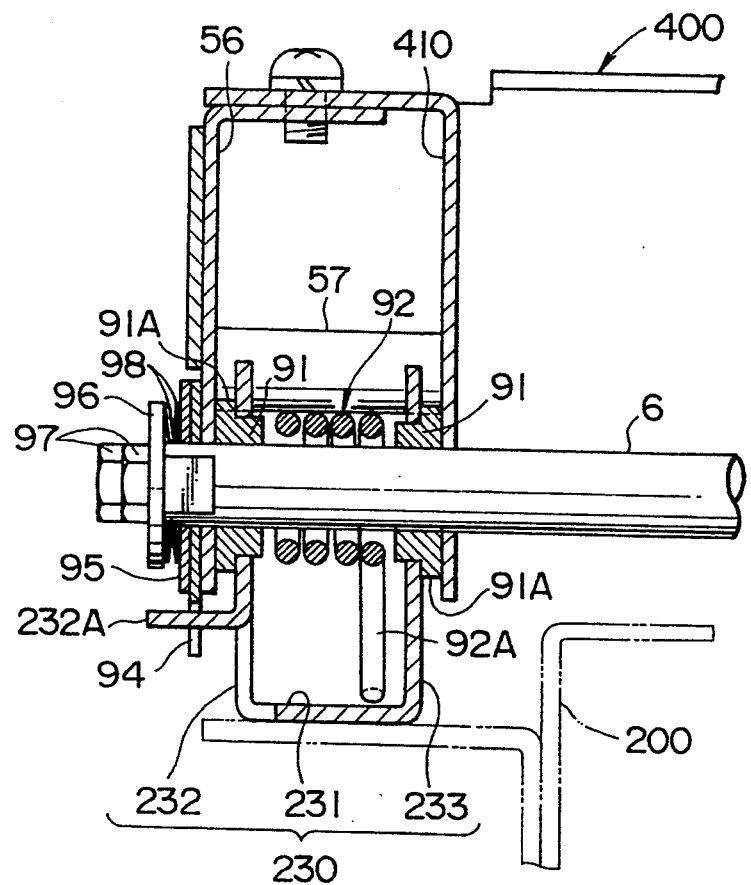
FIG. 36 is a cross-sectional view taken along line R—R of FIG. 35.

Each of the brackets 230 has a U-shaped cross section including spaced support side plates 232, 233 extending upwardly from opposite ends of a base plate 231, as shown in FIG. 36. The width of the bracket 230 is smaller than the distance between an inner surface of the support plate 56 and an outer surface of the side plate 410.

In FIG. 36, the bracket 230 is positioned between the side plate 410 and the support plate 56. The pivot shaft 6 extends through the side plate 410, the bracket 230, and the support plate 56. In this fashion, the cover frame 400 is pivotally coupled to the housing 2 by the pivot shaft 6.

Flanged bushings 91 are nonrotatably fitted respectively in the support side plates 232, 233, respectively, of the bracket 230. The bushings 91 have respective flanges 91A interposed between outer surfaces of the support side plates 232, 233 and inner surfaces of the side plate 410 and the support plate 56. The pivot shaft 6 is rotatably fitted in the bushings 91. Because of the bushings 91, the joint structures 90 are smoothly angularly movable with respect to the brackets 230 without wobbling along the pivot shaft 6.

The pivot shaft 6 has opposite ends which are not circular in cross section, but have parallel flat surfaces. The opposite ends of the pivot shaft 6 are fitted in and extend through complementary noncircular holes defined in the support plates 56. Therefore, the pivot shaft 6 is not rotatable with respect to the support plates 56, and hence, the cover frame 400.

A washer 96 is fixed by double nuts 97 to each of the ends of the pivot shaft 6 which project out of the support plates 56. Between the washer 96 and the support plate 56, there are interposed two inner and outer friction plates 94, 95 having mutually engaging surfaces of a predetermined coefficient of friction. Two disc springs 98 are disposed between the outer friction plate 95 and the washer 96.

The outer friction plate 95 is in the form of a disc-shaped plain washer having a noncircular hole complementary in shape to the end of the pivot shaft 6. Thus, the outer friction plate 95 is held nonrotatable with respect to the pivot shaft 6.

Figure 35:
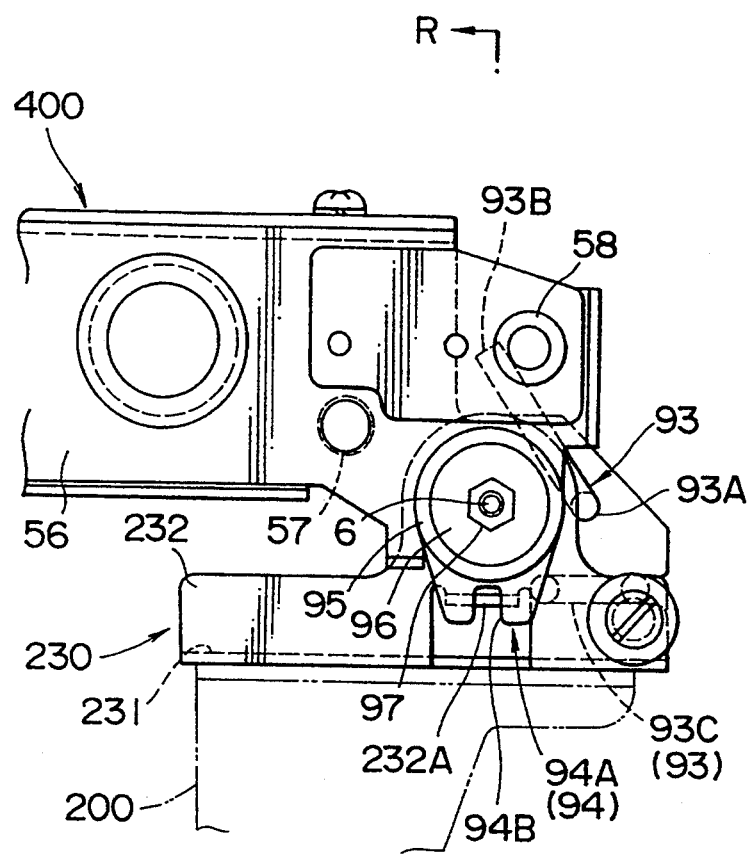
FIG. 35 is a side elevational view of a joint structure as viewed in the direction indicated by the arrow P in FIG. 34.

The inner friction plate 94 comprises a disc having the same outside diameter as the outer friction plate 95, and a bifurcated arm 94 extending radially outwardly from the disc and having a central slot 94B, as shown in FIG. 35. The bifurcated arm 94 extends downwardly, and a lever 232A, bent outwardly from the outer support side plate 232 of the bracket 230, is fitted in the slot 94B. Therefore, the inner friction plate 94 is held nonrotatable with respect to the bracket 230.

Inasmuch as the outer friction plate 95 is nonrotatable with respect to the pivot shaft 6, which is nonrotatable with respect to the cover frame 400, and the inner friction plate 94 is nonrotatable with respect to the bracket 230 that is fixed to the chassis 200, the outer friction plate 95 rotates with respect to the inner friction plate 94, when the cover 4 is angularly moved relative to the housing 2. Upon angular movement of the cover 4, a frictional resistance is produced between the friction plates 94, 95 depending on the force applied by the disc springs 98 to press the friction plates 94, 95, and also on the coefficient of friction of the friction plates 94, 95. Accordingly, the angular movement of the cover 4 is resisted by the frictional engagement between the friction plates 94, 95. While two friction plates 94, 95 are employed in the illustrated embodiment, each of the friction plates may comprise a plurality of superposed friction plates.

A torsion coil spring 92 is disposed around the pivot shaft 6 between the support side plates 232, 233 of each of the brackets 230. The torsion coil spring 92 has an outwardly extending end 92A engaging an upper surface of the base plate 231 of the bracket 230 and an opposite outwardly extending end 92B engaging a lower side of a shaft 57 extending between and joining the side plate 410 and the support plate 56. The torsion coil spring 92 is preloaded in a direction to spread the outwardly extending ends 92A, 92B thereof away from each other, thereby forcing the shaft 57 in a direction to urge the cover frame 400 to lift its distal end for opening the cover 4.

Figure 37:
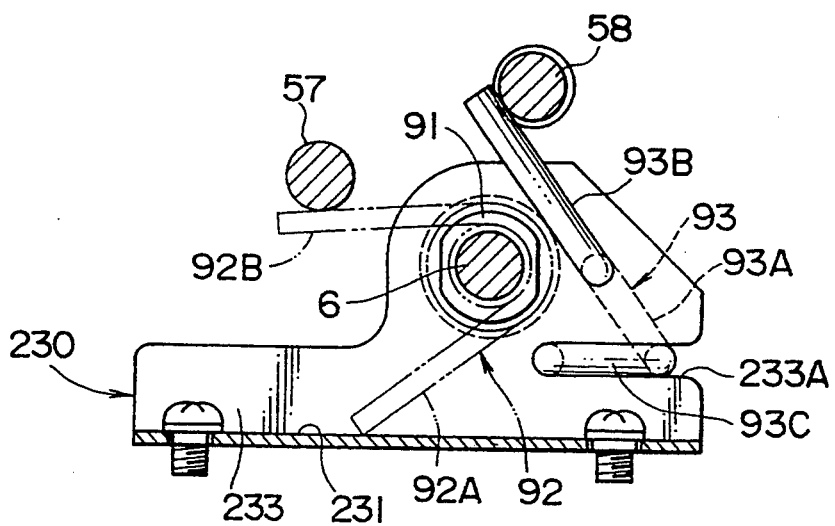
FIG. 37 is a cross-sectional view taken along line S—S of FIG. 34.

Two torsion bars 93 extend between and are supported by the inner support side plates 233 of the brackets 230. Each of the torsion bars 93 has a shank 93A having one end bent at a right angle into an actuating rod 93B and the opposite end bent into a U-shaped engaging rod 93C. The actuating rod 93B extends through the inner support side plate 233 of one of the brackets 230, and has its distal end positioned underneath a pin 58 mounted on the inner surface of the support plate 56. The engaging rod 93C is fitted in a horizontal slot 233A defined in the support side plate 233 of the other bracket 230 and opening rearwardly, i.e., to the right in FIG. 37. With the rods 93B, 93C being thus engaged, the torsion bar 93 is held nonrotatable about its axis. The actuating rod 93B and the engaging rod 93C are angularly spaced from each other when the torsion bar 93 is in its free state. The actuating rod 93B and the engaging rod 93C are mounted in position when the torsion bar 93 is twisted about its own axis, such that the angle between the mounted rods 93B, 93C is smaller than the angle between them when the torsion bar 93 is in its free state. Therefore, when mounted in position, the actuating rod 93B and the engaging rod 93C are preloaded, tending to spread away from each other. When the cover 4 is closed, as shown in FIG. 37, the actuating rod 93B applies a biasing force to the pin 58 in a direction causing the cover frame 400 to lift its distal end for opening the cover 4. The two torsion bars 93 are symmetrically arranged to apply uniform forces to the lateral sides of the cover 4, as shown in FIG. 34.

The torsion coil springs 92 are preloaded to impose resilient forces in a direction to open the cover 4 in a full range of angular movement of the cover 4. The torsion bars 93 are preloaded to impose resilient forces in a direction to open the cover 4 in a certain initial angular range of angular movement of the cover 4.

As the cover 4 is opened through a larger angle, the elastic deformation of the torsion coil springs 92 becomes smaller, and so are the biasing forces thereof. However, since the moment applied by the weight of the cover 4, in a direction to open the cover 4, is also reduced as the cover 4 is opened to a greater angular extent, it is possible to select a suitable spring constant for the torsion coil springs 92 in a manner to keep the spring bias and the weight-induced moment in balance.

The torsion bars 93 cannot apply torsional biasing forces in the full range of angular movement of the cover 4, but are capable of producing strong torsional biasing forces in a limited angular range.

Figure 38:
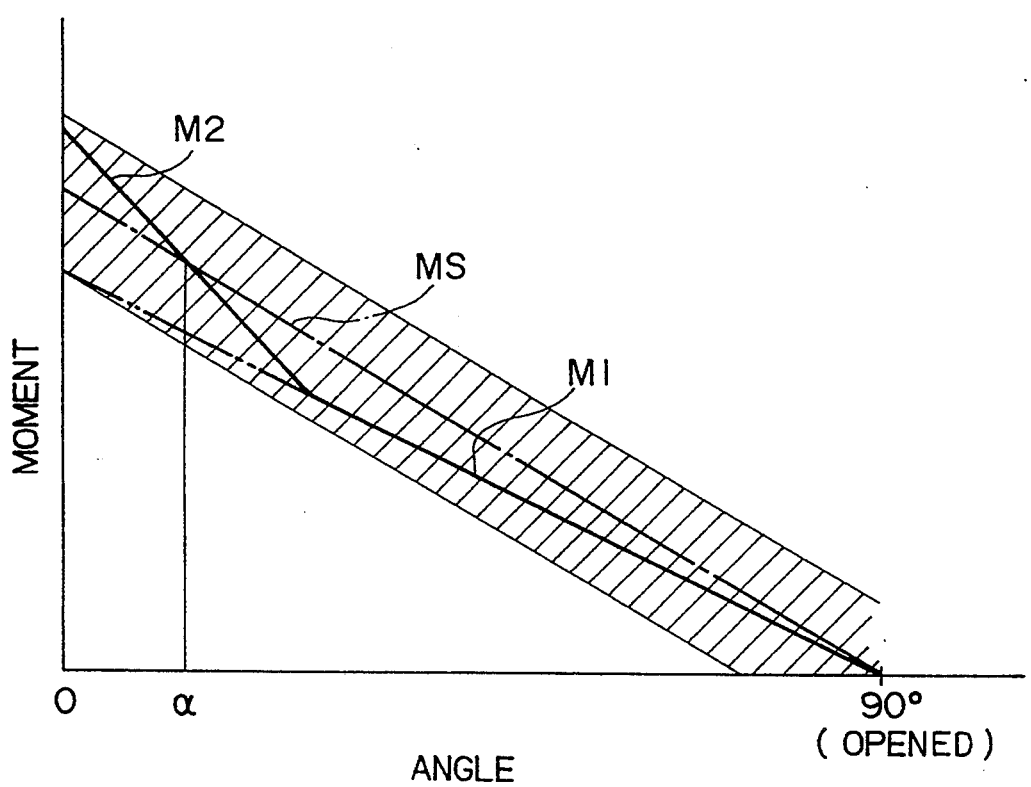
FIG. 38 is a graph showing the moment applied to a cover.

The moment applied by both the torsion coil springs 92 and the torsion bars 93, in a direction to open the cover 4, and the moment applied by the weight of the cover 4, in a direction to close the cover 4, are related to each other, as shown in FIG. 38. Specifically, the moment, denoted at M1, applied by the torsion coil springs 92, to open the cover 4, is slightly smaller than the moment, denoted at MS, applied by the weight of the cover 4, to open the cover 4, in the full angular range of opening movement of the cover 4. The torsion bars 93 apply a moment M2 in a limited angular range after the cover 4 has started to be opened. Therefore, the sum of the moments M1, M2 is larger than the moment MS when the cover 4 has been opened through an angle $\alpha°$.

When the cover 4 has been opened through the angle $\alpha°$, since the sum of the moments M1, M2 and the moment MS are counterbalanced, the cover 4 can be held at rest at the angle $\alpha°$ if no external force is applied. When the angle of the cover 4 is smaller than the angle $\alpha°$, since the sum of the moments M1, M2 is larger than the moment MS, the cover 4 is angularly moved in an opening direction. When the angle of the cover 4 is larger than the angle $\alpha°$, since the sum of the moments M1, M2 is smaller than the moment MS, the cover 4 is angularly moved in a closing direction.

The cover 4 has a lock mechanism on its distal end. When the cover 4 is closed, the lock mechanism locks the cover 4 on the housing 2 to keep the cover 4 closed against the sum of the moments M1, M2.

If it were not for the friction plates 94, 95, when the cover 4 is unlocked from the housing 2, the cover 4 would be opened to the angle $\alpha°$ under the bias of the torsion coil springs 92 and the torsion bars 93, and held at the angle $\alpha°$. When the cover 4 is to be opened further, it could be angularly moved with a small manual force, assisted by the torsion coil springs 92 and the torsion bars 98. When the cover 4 is to be closed from an open position, it could easily be closed down to the angle $\alpha°$ because the moment MS, applied by the weight of the cover 4, is greater than the biasing forces or moments M1, M2 applied by the torsion coil springs 92 and the torsion bars 93. At this time, the cover 4 may be manually supported by hand. When released from the hand on its way to the closed position, the cover 4 would tend to be closed of its own accord. In the angular range smaller than the angle $\alpha°$, however, since the sum of the moments M1, M2 is greater than the moment MS, the moments M1, M2 would serve as a damper to prevent the cover 4 from hitting the document support 3. As described above, the trosion coil springs 92 apply biasing forces tending to open the cover 4 in the full range of angular movement of the cover 4, whereas the trosion bars 93 apply biasing forces tending to open the cover 4 in an initial limited range of angular movement of the cover 4. These biasing forces from the torsion coil springs 92 and the torsion bars 93 are combined to counterbalance the weight-induced moment applied to the cover 4 for keeping the cover 4 open at a certain angle. The assistive biasing forces to be applied to the cover 4, by the torsion coil springs 92 and the torsion bars 93, and the angle at which the cover 4 is kept open can independently be selected with ease.

In the illustrated embodiment, the friction plates 94, 95 present a frictional resistance to the angular movement of the cover 4. The frictional resistance produced by the friction plates 94, 95 is of a magnitude large enough to resist the moment applied by the torsion coil springs 92 and the torsion bars 93 in a direction to open the cover 4, when the cover 4 is on its way to the closed position, and also to resist the maximum moment applied by the weight of the cover 4 in a direction to close the cover 4 when the cover is opened beyond the angle $\alpha°$, as indicated by a hatched area in FIG. 38.

Therefore, the cover 4 remains in whatever position it has reached unless subjected to external forces, and can be held at rest in the closed position or at any angle. Because the cover 4 is most stable when it is opened to the angle $\alpha°$ where the moment MS is counterbalanced by the sum of the moments M1, M2, the cover 4 is stopped at the angle $\alpha°$, if it is forced out of a balanced condition for some reason.

With the angular movement of the cover 4 being limited by the frictional resistance produced by the friction plates 94, 95, a wide range of settings is made available for the biasing forces of the torsion coil springs 92 and the torsion bars 93, and desired settings can easily be selected.

Consequently, when the cover 4 is angularly moved, any manual force required is small because the angular movement of the cover 4 can be assisted by the torsion coil springs 92 and the torsion bars 93. Furthermore, the cover 4 is further prevented from being abruptly moved, but is allowed to move slowly and gently, due to the frictional resistance produced by the friction plates 94, 95. The cover 4 is therefore protected from hitting engagement with the document support 3.

The friction plates 94, 95 are thus effective to absorb changes in the forces required to open and close the cover 4, which forces vary depending on the angle to which the cover 4 is angularly moved. Therefore, the cover 4 is permitted to be opened and closed smoothly. Since the cover 4 is not angularly moved abruptly, it is prevented from being closed quickly and hitting the document support 3.

The present disclosure relates to subject matter contained in Japanese Patent Applications Nos. HEI 3-326922, filed on Nov. 15, 1991, HEI 3-326923, filed on Nov. 15, 1991, HEI 3-326924, filed on Nov. 15, 1991, HEI 3-326925, filed on Nov. 15, 1991, HEI 3-331240, filed on Nov. 20, 1991, HEI 3-331241, filed on Nov. 20, 1991, HEI 3-348954, filed on Dec. 6, 1991, HEI 3-351004, filed on Dec. 11, 1991, and HEI 3-351005, filed on Dec. 11, 1991, which are expressly incorporated herein by reference in their entirties.

What is claimed is:

1. An imaging device comprising:
    a housing;
    a transparent document support mounted on said housing for supporting a document thereon;
    optical scanning device, movably housed in said housing below said transparent document support, for optically scanning a document placed on said transparent document support;
    a cover movably mounted on said housing for covering said transparent document support;
    a diffusion plate mounted on said cover in facing relationship to said transparent document support;
    a lamp unit housed in said cover for emitting light through said diffusion plate toward said transparent document support to irradiate the document placed thereon, said lamp unit being movable in synchronism with said optical scanning device, said lamp unit having a slider;
    a guide member mounted in said cover for guiding said slider to slide therealong; and
    locking means mounted in said cover, for engaging said lamp unit to lock said slider against movement along said guide member.

2. The imaging device according to claim 1, wherein said locking device comprises:
    a fastening pin rotatably supported in said cover, said fastening pin having on one end thereof an externally threaded portion, threaded through said guide member, and a fitting finger joined to said externally threaded portion for fitting engagement in said lamp unit, whereby said fitting finger can be brought into fitting engagement with said lamp unit in response to rotation of said fastening pin when said lamp unit is in a predetermined position with respect to said cover.

3. The imaging device according to claim 2, wherein said lamp unit has a hole for receiving said fitting finger therein.

4. The imaging device according to claim 2, wherein said fastening pin has a screwdriver slot defined in an opposite end thereof, said cover having a hole for accessing said screwdriver slot therethrough.

* * * * *